United States Patent
Va et al.

(10) Patent No.: US 12,369,129 B2
(45) Date of Patent: Jul. 22, 2025

(54) METHOD AND APPARATUS FOR DETERMINING TRANSMIT POWER BUDGET FOR MANAGING RF EXPOSURE OF MOBILE DEVICES USING RADAR SENSING

(71) Applicant: Samsung Electronics Co., Ltd., Suwon-si (KR)

(72) Inventors: Vutha Va, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 18/063,032

(22) Filed: Dec. 7, 2022

(65) Prior Publication Data
US 2023/0328663 A1 Oct. 12, 2023

Related U.S. Application Data

(60) Provisional application No. 63/328,488, filed on Apr. 7, 2022.

(51) Int. Cl.
H04W 52/22 (2009.01)
H04W 52/36 (2009.01)

(52) U.S. Cl.
CPC ....... H04W 52/367 (2013.01); H04W 52/223 (2013.01)

(58) Field of Classification Search
CPC ............. H04W 52/367; H04W 52/223; H04W 52/225; H04L 5/0051
See application file for complete search history.

(56) References Cited

U.S. PATENT DOCUMENTS

| 11,310,747 B2 | 4/2022 | Kim et al. |
| 11,320,517 B2 | 5/2022 | Rimini et al. |
| 11,336,319 B2 | 5/2022 | Badic et al. |

(Continued)

FOREIGN PATENT DOCUMENTS

| WO | 2007142623 A1 | 12/2007 |
| WO | 2018112430 A1 | 6/2018 |

(Continued)

OTHER PUBLICATIONS

Extended European Search Report issued Feb. 6, 2025 regarding Application No. 22936655.4, 8 pages.

(Continued)

*Primary Examiner* — Vinncelas Louis

(57) ABSTRACT

A method for managing a maximum permissible exposure (MPE) limit that corresponds to a time window is provided. The method includes estimating, based on radar detection information and transmission history information, a previous radio frequency exposure (RFE) for a target that occurred during a previous time period of the time window. The method includes predicting a future RFE on the target to occur during a future time period of the time window such that a sum of the estimated previous RFE and the predicted future RFE does not exceed the MPE limit for the time window. The method includes determining, based on the predicted future RFE, a transmission power budget for a transceiver of an electronic device for transmission during the future time period.

20 Claims, 9 Drawing Sheets

(56) References Cited

U.S. PATENT DOCUMENTS

| | | | |
|---|---|---|---|
| 2006/0128422 A1 | 6/2006 | van Rooyen | |
| 2012/0270592 A1 | 10/2012 | Ngai et al. | |
| 2017/0290011 A1 | 10/2017 | Kushnir et al. | |
| 2018/0160377 A1 | 6/2018 | Abramsky et al. | |
| 2018/0167241 A1 | 6/2018 | Dezfooliyan et al. | |
| 2020/0297236 A1 | 9/2020 | Rimini et al. | |
| 2020/0300996 A1 | 9/2020 | Cetinoneri et al. | |
| 2020/0411960 A1 | 12/2020 | Ng et al. | |
| 2021/0099194 A1 | 4/2021 | Jadhav et al. | |
| 2021/0126719 A1 | 4/2021 | Rimini | |
| 2021/0297104 A1 | 9/2021 | Zhou et al. | |
| 2022/0200648 A1 | 6/2022 | Das et al. | |
| 2023/0413194 A1* | 12/2023 | Sambhwani | H04W 52/225 |
| 2025/0016689 A1* | 1/2025 | Li | H04L 5/0051 |

FOREIGN PATENT DOCUMENTS

| | | |
|---|---|---|
| WO | 2021033092 A1 | 2/2021 |
| WO | 2023013928 A1 | 2/2023 |

OTHER PUBLICATIONS

International Search Report and Written Opinion issued Apr. 10, 2023 regarding International Application No. PCT/KR2022/021605, 6 pages.

Federal Communications Commission, FCC 13-39, Mar. 2013, 202 pages.

\* cited by examiner

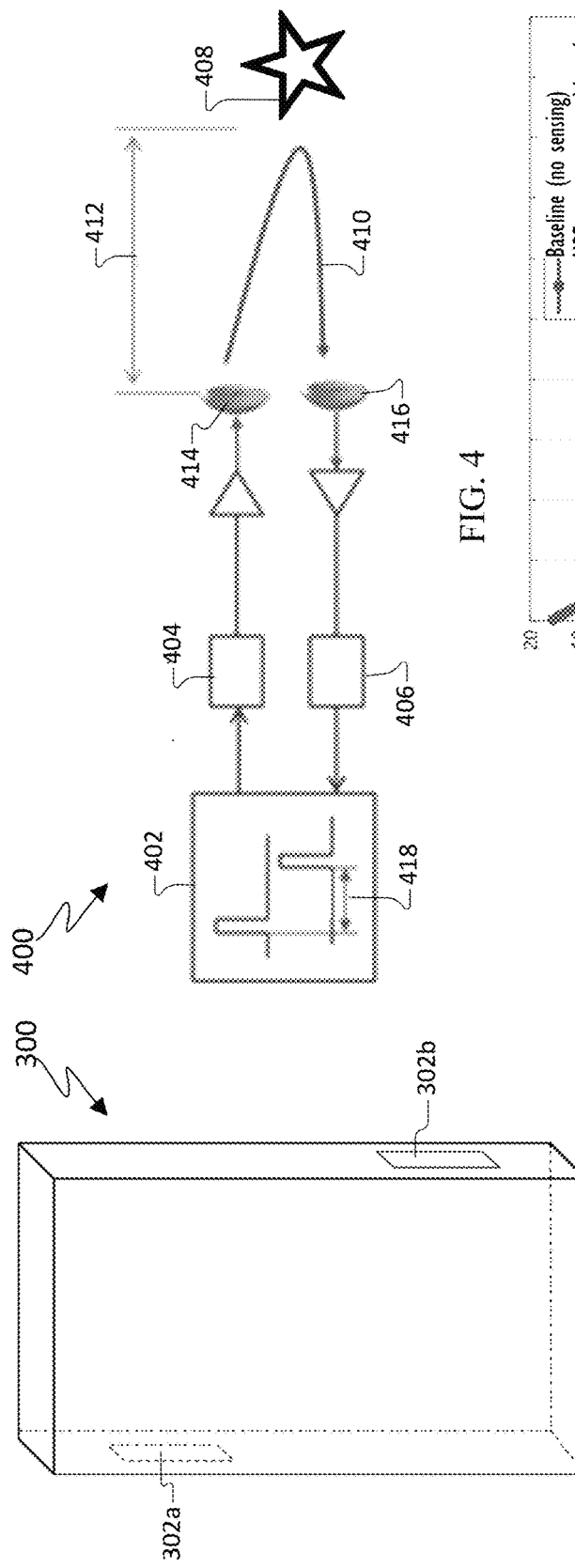
FIG. 3
FIG. 4
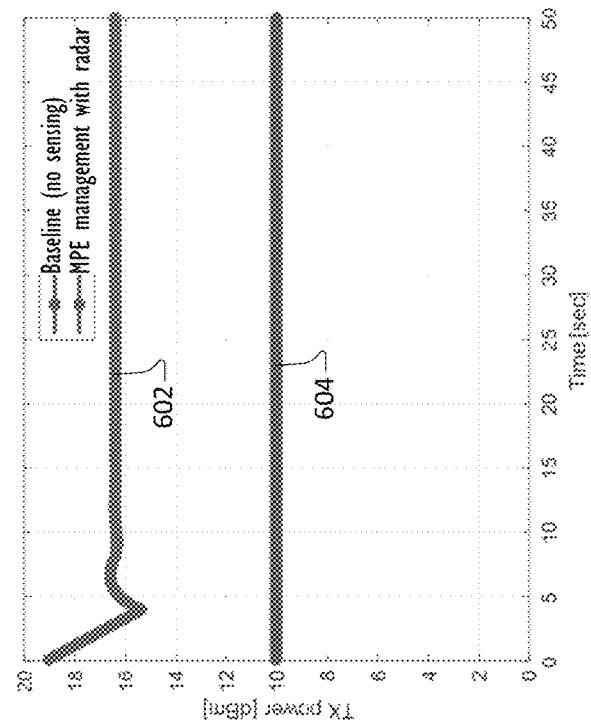
FIG. 6
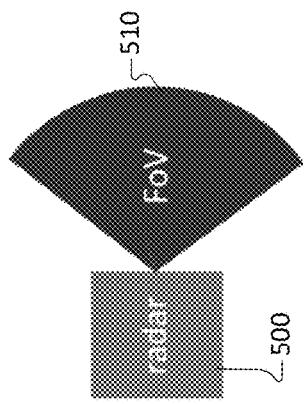
FIG. 5

METHOD AND APPARATUS FOR DETERMINING TRANSMIT POWER BUDGET FOR MANAGING RF EXPOSURE OF MOBILE DEVICES USING RADAR SENSING

CROSS-REFERENCE TO RELATED APPLICATION(S) AND CLAIM OF PRIORITY

This application claims priority under 35 U.S.C. § 119(e) to U.S. Provisional Patent Application No. 63/328,488 filed on Apr. 7, 2022. The above-identified provisional patent application is hereby incorporated by reference in its entirety.

TECHNICAL FIELD

This disclosure relates generally to wireless communication devices. More specifically, this disclosure relates to a method and apparatus for determining transmit power budget for managing RF exposure of mobile devices using radar sensing.

BACKGROUND

A communication system includes a DownLink (DL) that conveys signals from transmission points such as Base Stations (BSs) or gNodeBs to User Equipments (UEs) and an UpLink (UL) that conveys signals from UEs to reception points such as gNodeBs. A UE, also commonly referred to as a terminal or a mobile station, may be stationary or mobile and may be a cellular phone, a personal computer device, etc. A gNodeB, which is generally a fixed station, may also be referred to as an access point or other equivalent terminology.

For mmWave bands, the number of antenna elements can be large for a given form factor. However, the number of digital chains is limited due to hardware constraints (such as the feasibility to install a large number of ADCs/DACs at mmWave frequencies). In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. That is, to compensate for the narrower analog beamwidth in mmWave, analog beams sweeping can be employed to enable wider signal reception or transmission coverage for the UE. A beam codebook comprises a set of codewords, where a codeword is a set of analog phase shift values, or a set of amplitude plus phase shift values, applied to the antenna elements, in order to form an analog beam.

The UE implements a beam management procedure to maintain the best antenna module as well as the corresponding best beam of an antenna module for signal reception and transmission by the UE. The UE may also use multiple antenna modules simultaneously, in which case the beam management procedure can determine the best beam of each antenna module for signal reception and transmission by the UE.

A common type of radar is the "monostatic" radar, characterized by the fact that the transmitter of the radar signal and the receiver for its delayed echo are practically in the same location. For example, the radar transmitter and receiver are co-located, either by using a common antenna, or are nearly co-located, while using separate, but adjacent antennas. Monostatic radars are coherent, such that the transmitter and receiver are synchronized via a common time reference.

SUMMARY

This disclosure provides a method and apparatus for determining transmit power budget for managing RF exposure of mobile devices using radar sensing.

In one embodiment, a method for determining a transmit power budget of a mobile device to prevent overexposure of radio frequency energy on a human user based on radar sensing results is provided. The method includes estimating, based on radar detection information and transmission history information, a previous radio frequency exposure (RFE) for a target that occurred during a previous time period of the time window. The method includes predicting a future RFE on the target to occur during a future time period of the time window such that a sum of the estimated previous RFE and the predicted future RFE does not exceed the MPE limit for the time window. The method includes determining, based on the predicted future RFE, a transmission power budget for a transceiver of an electronic device for transmission during the future time period.

In another embodiment, an electronic device for determining a transmit power budget of a mobile device to prevent overexposure of radio frequency energy on a human user based on radar sensing results is provided. The electronic device includes a radar circuit, a transmission circuit, and a processor operatively connected to the radar circuit and the transmission circuit. The processor is configured to estimate, based on radar detection information and transmission history information, a previous radio frequency exposure (RFE) for a target that occurred during a previous time period of the time window. The processor is configured to predict a future RFE on the target to occur during a future time period of the time window such that a sum of the estimated previous RFE and the predicted future RFE does not exceed the MPE limit for the time window. The processor is configured to determine, based on the predicted future RFE, a transmission power budget for the transceiver of an electronic device for transmission during the future time period.

In yet another embodiment, a non-transitory computer readable medium comprising program code for determining a transmit power budget of a mobile device to prevent overexposure of radio frequency energy on a human user based on radar sensing results is provided. The computer readable program code causes the processor to estimate, based on radar detection information and transmission history information, a previous radio frequency exposure (RFE) for a target that occurred during a previous time period of the time window. The computer readable program code causes the processor to predict a future RFE on the target to occur during a future time period of the time window such that a sum of the estimated previous RFE and the predicted future RFE does not exceed the MPE limit for the time window. The computer readable program code causes the processor to determine, based on the predicted future RFE, a transmission power budget for the transceiver of an electronic device for transmission during the future time period.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a three-dimensional view of an example electronic device that includes multiple millimeter wave (mmWave) antenna modules in accordance with an embodiment of this disclosure;

FIG. 4 illustrates an example architecture of a monostatic radar in an electronic device 400 in accordance with an embodiment of this disclosure;

FIG. 5 illustrates an example radar in accordance with an embodiment of this disclosure;

FIG. 6 shows an example graph of TX power output from the communication module of an electronic device over time in accordance with an embodiment of this disclosure;

DETAILED DESCRIPTION

Figure 1:
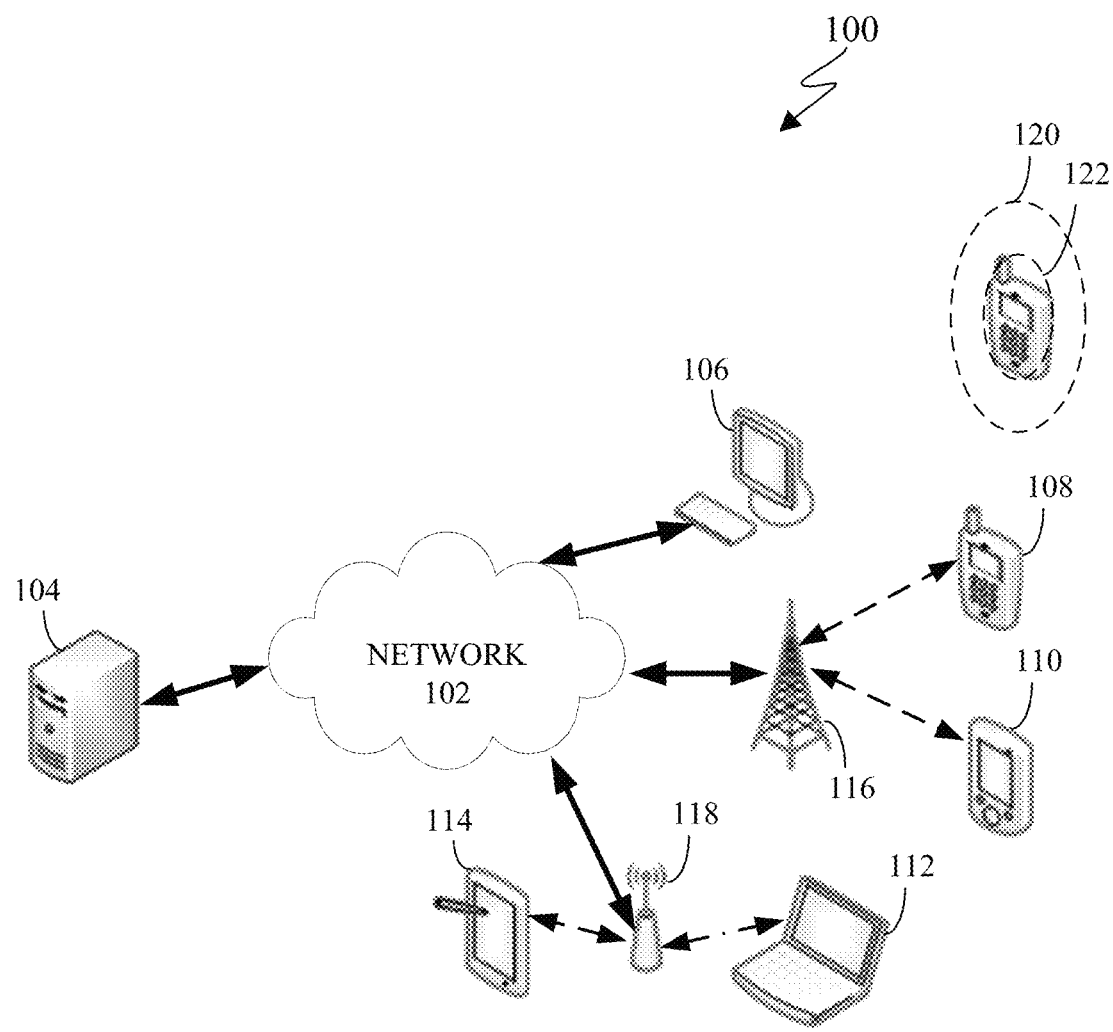
FIG. 1 illustrates an example communication system in accordance with an embodiment of this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Regulators, such as the U.S. Federal Communications Commission (FCC), define radio frequency (RF) compliance requirements for radio devices to ensure safety of operations. The RF compliance requirements aim to prevent a human exposure hazard, which is represented by a tissue temperature change. The RF compliance requirements govern RF exposure (RFE) on a human body generated from mobile devices. The RF compliance requirements govern RFE in both low frequency bands (for example, lower than or equal to 6 GHz) and high frequency bands (higher than 6 GHz). Particularly, the RF compliance requirements specify an RFE limit, such as a maximum permissible exposure (MPE) limit.

The MPE limits adopted by the FCC are defined in terms of power density (units of milliwatts per centimeter squared: $mW/cm^2$), electric field strength (units of volts per meter: V/m) and magnetic field strength (units of amperes per meter: A/m). Further, the MPE limits adopted by the FCC are time-average exposure limits, that are additionally defined in terms of frequency range (units of MHz), and averaging time (units of minutes). The averaging time is a window of time or a time period over which exposure is averaged for purposes of determining compliance with RF exposure limits. Herein, the averaging time corresponding to the MPE limit is referred to as the averaging window ($T_{wind}$).

The RF compliance requirements that define the MPE limits require that the average exposure never exceeds the regulatory limit. The MPE limits adopted by the FCC are metrics for the exposure that may be different depending on the RF frequency (i.e., RF-frequency dependent MPE limits). For example, a specific absorption rate (SAR) could be used to define an MPE limit at low frequencies (such as below 6 GHz), while a power density (PD) could be used to define an MPE limit at high frequencies (such as above 6 GHz). Both the RFE from low frequencies and the RFE from high frequencies are normalized (i.e., unitless) and combined to obtain an overall RF exposure level. Normalizing and combining can include determining an average, such as a statistical average that is a mean, median, or mode. In this disclosure, the averaged overall RF exposure level is required to be below the MPE limit for any choice of the averaging window. Also in this disclosure, the averaged overall RF exposure level is simply referred to as the "RFE," where the length of the averaging window is defined by the regulatory body.

An MPE limit poses a challenge for 5G mmWave uplink communication, as 5G millimeter wave operation utilizes narrow beams, but beamforming increases power density. Beamforming concentrates the energy of an RF signal in a certain direction, which means increasing the power density in that certain direction, and consequently increasing the likelihood of an RFE issue. Two methods to avoid RFE issues include reducing TX power and/or using wider beams that spread out energy of an RF signal and that reduce power density. However, in the case of mmWave, because a high frequency RF signal is characterized by a weak propagation property, a reduction of TX power would degrade link quality, which is not a desirable result.

To meet the exposure regulations, communication systems could implement a very conservative technique, for example to assume a worst-case exposure level such as when a human body part is on the surface of the mobile device. This very conservative technique uses low enough Equivalent Isotropically Radiated Power (EIRP) either by lowering the transmit (TX) power and/or antenna gain in combination with adjusting the duty cycle so that RFE limit is not exceeded even when the worst-case exposure level occurred the whole time. While this conservative technique can ensure regulatory compliance, the wireless communication module (WCM) is forced to operate at suboptimal link quality and thus cannot reap the potential for very high data rate services. That is, this conservative technique utilizes low enough power and/or wide beams to guard against exceeding the RFE limit, and a result limits UL quality both in coverage and throughput.

To meet the exposure regulations, communication systems could implement a more advanced technique, which is to use a sensor, such as a radar, to determine the location of human body part in relation to the device. Such information can be used to estimate the actual level of exposure that occurs. According to this more advanced technique, the communication transmitter can exploit opportunities to transmit at a higher transmit power (than the above-described very conservative technique) that can support better wireless link quality and higher data rate, when there is low exposure (e.g., when human body part is not in the field of view of the sensor or located at a far distance).

A problem with existing approaches and techniques is that they only use the communication transmission configuration information, but do not use sensing history to determine a maximum TX power. Embodiments of this disclosure overcome the problem of the existing approaches and techniques. Particularly, embodiments according to this disclosure provide solutions that use historical information, including sensing history (namely, the history of locations of human body part relative to the location of the radar sensor) and the communication transmission configuration history (for example, TX power, beam index, beam patterns, etc.), to determine a "TX power budget" (for example, the maximum TX power) of a mobile device that could be used without causing overexposure of the RF energy on the human user.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver. In certain embodiments, the client devices 106-114 are able to sense the presence of an object located close to the client device and determine whether the location of the detected object is within a first area 120 or a second area 122 closer to the client device than a remainder of the first area 120 that is external to the first area 120. In certain embodiments, the boundary of the second area 122 is at a proximity that is almost touching the client device, and the first area 120 can be within a close range (e.g., 1 meter away, or 2 meters away) from the client device.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
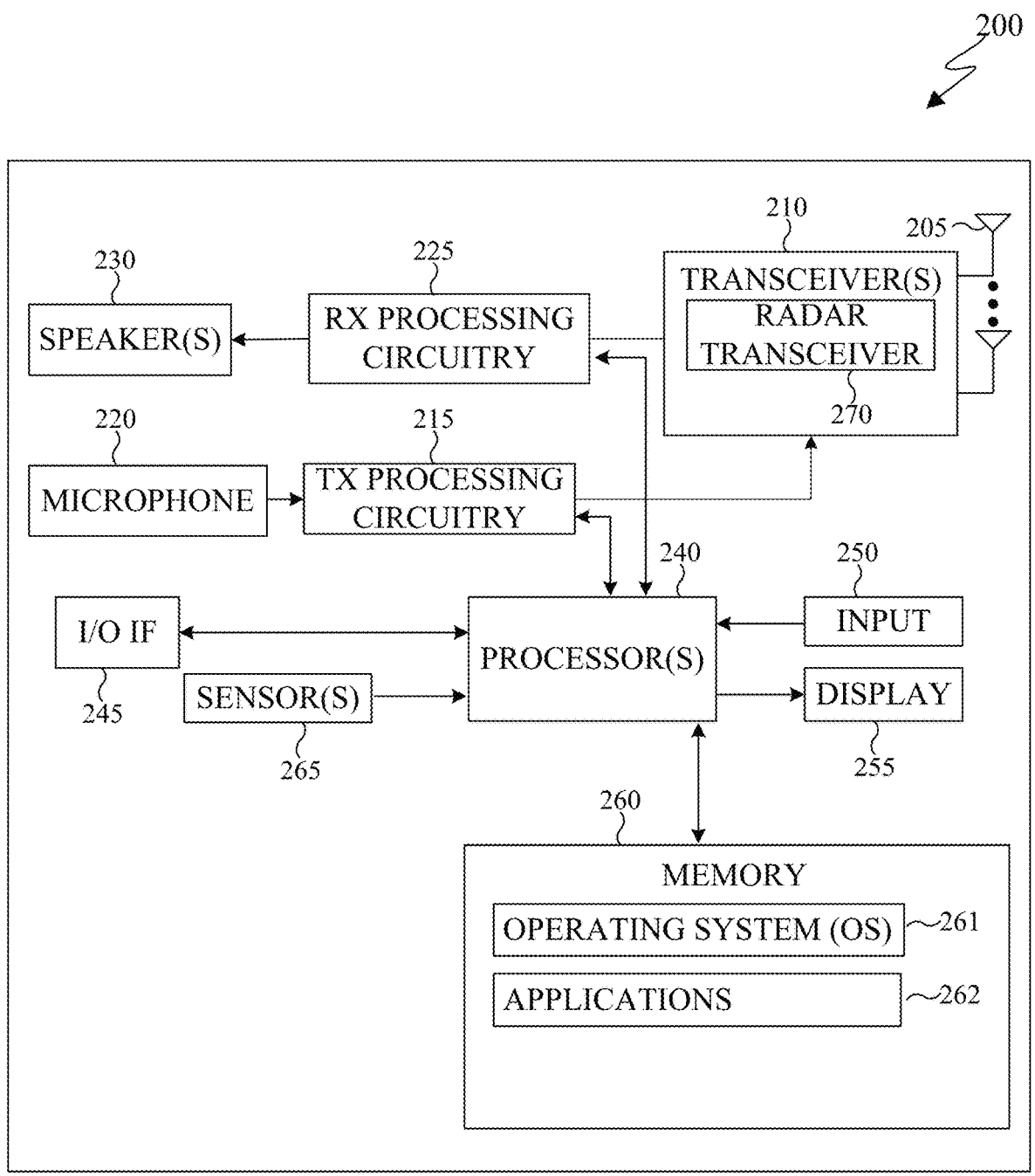
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at various frequencies. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

In certain embodiments, the radar transceiver 270 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter can transmit millimeter wave (mmWave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving.

Although FIG. 4 illustrates one example architecture of a monostatic radar in the electronic device 400, various changes can be made to FIG. 4. For example, various components in FIG. 4 can be combined, further subdivided, or omitted and additional components can be added according to particular needs. As a particular example, and the target 408 is a human body.

FIG. 5 illustrates an example radar 500 in accordance with an embodiment of this disclosure. The embodiment of the radar 500 shown in FIG. 5 is for illustration only, and other embodiments could be used without departing from the scope of this disclosure. As one embodiment, the radar 500 is a monostatic radar and can include the architecture of the monostatic radar in the electronic device 400 of FIG. 4. In another embodiment, the radar 500 could be a bi-static radar. Generally, the radar 500 is a "radar circuit."

The radar 500 generates a radar signal, which can be a radar pulse as a realization of a desired "radar waveform," modulated onto a radio carrier frequency. The radar 500 transmits the radar pulse through a power amplifier and antenna (such as transmit antenna 414 of FIG. 4), either omni-directionally or focused into a particular direction. A target (such as target 408), at a distance R from the location of the radar 500 and within the field-of-view 510 of the transmitted signal, will be illuminated by RF power density $p_t$ (in units of W/m$^2$) for the duration of the transmission of the radar pulse. Herein, the distance R from the location of the radar 500 to the location of the target is simply referred to as the "target distance." To first order, $p_t$ can be described by Equation 1, where $P_T$ represents transmit power in units of watts (W), $G_T$ represents transmit antenna gain in units of decibels relative to isotropic (dBi), $A_T$ represents effective aperture area in units of square meters (m$^2$), and $\lambda$ represents wavelength of the radar signal RF carrier signal in units of meters. In Equation 1, effects of atmospheric attenuation, multi-path propagation, antenna losses, etc. have been neglected.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \tag{1}$$

The transmit power density impinging onto the surface of the target will reflect into the form of reflections depending on the material composition, surface shape, and dielectric behavior at the frequency of the radar signal. Note that off-direction scattered signals are typically too weak to be received back at the radar receiver (such as receive antenna 416 of FIG. 4), so typically, only direct reflections will contribute to a detectable receive signal. In essence, the illuminated area(s) of the target with normal vectors pointing back at the receiver will act as transmit antenna apertures with directivities (gains) in accordance with corresponding effective aperture area(s). The power of the reflections, such as direct reflections reflected and received back at the radar receiver, can be described by Equation 2, where $P_{refl}$ represents effective (isotropic) target-reflected power in units of watts, $A_t$ represents effective target area normal to the radar direction in units of m$^2$, $G_t$ represents corresponding aperture gain in units of dBi, and RCS represents radar cross section in units of square meters. Also in Equation 2, $r_t$ represents reflectivity of the material and shape, is unitless, and has a value between zero and one inclusively ([0, . . . , 1]). The RCS is an equivalent area that scales proportional to the actual reflecting area-squared, inversely proportional with the wavelength-squared, and is reduced by various shape factors and the reflectivity of the material itself. For a flat, fully reflecting mirror of area $A_r$, large compared with $\lambda^2$, RCS=$4\pi A_r^2/\lambda^2$. Due to the material and shape dependency, it is generally not possible to deduce the actual physical area of a target from the reflected power, even if the target distance R is known. Hence, the existence of stealth objects that choose material absorption and shape characteristics carefully for minimum RCS.

$$P_{refl} = p_t A_t G_t \sim p_t A_t r_t \frac{A_t}{(\lambda^2/4\pi)} = p_t RCS \tag{2}$$

The target-reflected power ($P_R$) at the location of the receiver results from the reflected-power density at the reverse distance R, collected over the receiver antenna aperture area. For example, the target-reflected power ($P_R$) at the location of the receiver can be described by Equation 3, where $A_R$ represents the receiver antenna effective aperture area in units of square meters. In certain embodiments, $A_R$ may be the same as $A_T$.

$$P_R = \frac{P_{refl}}{4\pi R^2} A_R = P_T \cdot RCS \frac{A_T A_R}{4\pi \lambda^2 R^4} \tag{3}$$

The target distance sensed by the radar 500 usable (for example, reliably accurate) as long as the receiver signal exhibits sufficient signal-to-noise ratio (SNR), the particular value of which depends on the waveform and detection method used by the radar 500 to sense the target distance. The SNR can be expressed by Equation 4, where k represents Boltzmann's constant, T represents temperature, and kT is in units of (W/Hz). In Equation 4, B represents bandwidth of the radar signal in units of Hertz (Hz), F represents receiver noise factor. The receiver noise factor represents degradation of receive signal SNR due to noise contributions of the receiver circuit itself.

$$SNR = \frac{P_R}{kT \cdot B \cdot F} \tag{4}$$

If the radar signal is a short pulse of duration $T_P$ (also referred to as pulse width), the delay $\tau$ between the transmission and reception of the corresponding echo can be expressed according to Equation 5, where c is the speed of light propagation in the medium (for example, air).

$$\tau = 2R/c \tag{5}$$

In a scenario in which several targets are located at slightly different distances from the radar 500, the individual echoes can be distinguished as such if the delays differ by at least one pulse width. Hence, the range resolution ($\Delta R$) of the radar 500 can be expressed according to Equation 6.

$$\Delta R = c\Delta\tau/2 = cT_P/2 \quad (6)$$

If the radar signal is a rectangular pulse of duration $T_P$, the rectangular pulse exhibits a power spectral density P(f) expressed according to Equation 7. The rectangular pulse has a first null at its bandwidth B, which can be expressed according to Equation 8. The range resolution $\Delta R$ of the radar 500 is fundamentally connected with the bandwidth of the radar waveform, as expressed in Equation 9.

$$P(f) \sim (\sin(\pi f T_P)/(\pi f T_P))^2 \quad (7)$$

$$B = 1/T_P \quad (8)$$

$$\Delta R = c/2B \quad (9)$$

Although FIG. 5 illustrates one example radar 500, various changes can be made to FIG. 5. For example, the radar 500 could include hardware implementing a monostatic radar with 5G communication radio, and the radar can utilize a 5G waveform according to particular needs. As a particular example, the radar 500 could include hardware implementing a bi-static radar with 5G communication radio, and the radar can utilize a 5G waveform according to particular needs. In another example, the radar 500 could include hardware implementing a standalone radar, in which case, the radar transmits its own waveform (such as a chirp) on non-5G frequency bands such as the 24 GHz industrial, scientific and medical (ISM) band. In another particular example, the radar 500 could include hardware of a 5G communication radio that is configured to detect nearby objects, namely, the 5G communication radios has a radar detection capability.

Some electronic devices implement a binary method to prevent overexposure of RF energy on a human user by simply determining whether the target (such as a human body) is in the field of view 510 of the radar 500, and disabling (or reducing the transmit power of) the antenna module of the radar 500 that generated the field of view 510 in response to a determination that the target is in the field of view 510. The alternative outcome of this binary method is, in response to a determination that the target is not in the field of view 510, the electronic device enables the antenna module of the radar 500 to perform communication transmission using a transmit power that is not reduced (for example, increased or maintained).

Embodiments of this disclosure provide solutions for determining a TX power budget based on radar sensing, which is used to estimate an RFE level and to compensate for constraints, such as radar detection at discrete times (not instantaneous) and radar detection errors. Embodiments of this disclosure achieve an objective to allow a highest TX power while avoiding violation of the MPE and achieve another objective to avoid interruption of transmission due to a violation of the MPE.

FIG. 6 shows an example graph 600 of TX power output from the communication module of an electronic device (such as electronic device 200 of FIG. 2) over time. Particularly, the MPE management curve 602 represents the electronic device utilizing radar sensing to control transmitting RF signals at as high data rate. The MPE management curve 602 represents the communication module performing UL communication transmission at a highest TX power allowable based on the radar sensing. For the MPE management curve 602, it is assumed that a human is located 10 centimeters from the electronic device.

The baseline curve 604 represents operation of a communication module that does not use any sensing to detect the presence of a human or distance to a human body part, and thus operates under an assumption that a human body part is always on the surface of the electronic device. More particularly, the baseline curve 604 represents the communication module operating at a constant TX power (illustrated as 10 dBm) such that a worst-case exposure level accumulates over the course of the averaging window ($T_{wind}$). The value of worst-case exposure level is referred to as the "surface RFE value" ($RFE_{Sur}$) and in certain embodiments, is equal to the MPE limit.

Figure 7:
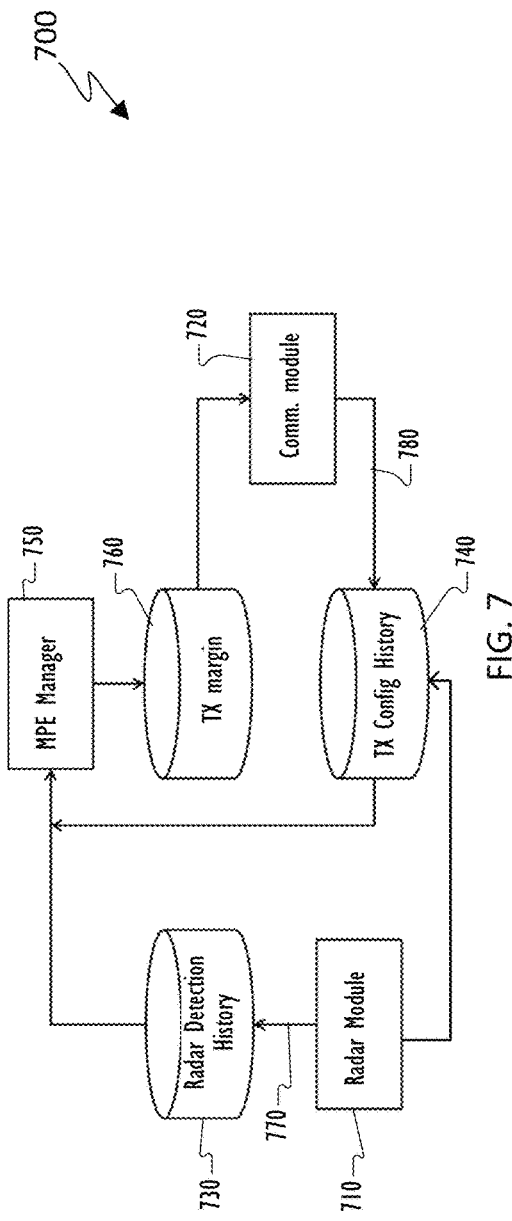
FIG. 7 illustrates an example architecture of an MPE management system using radar sensing in accordance with an embodiment of this disclosure.
Figure 8:
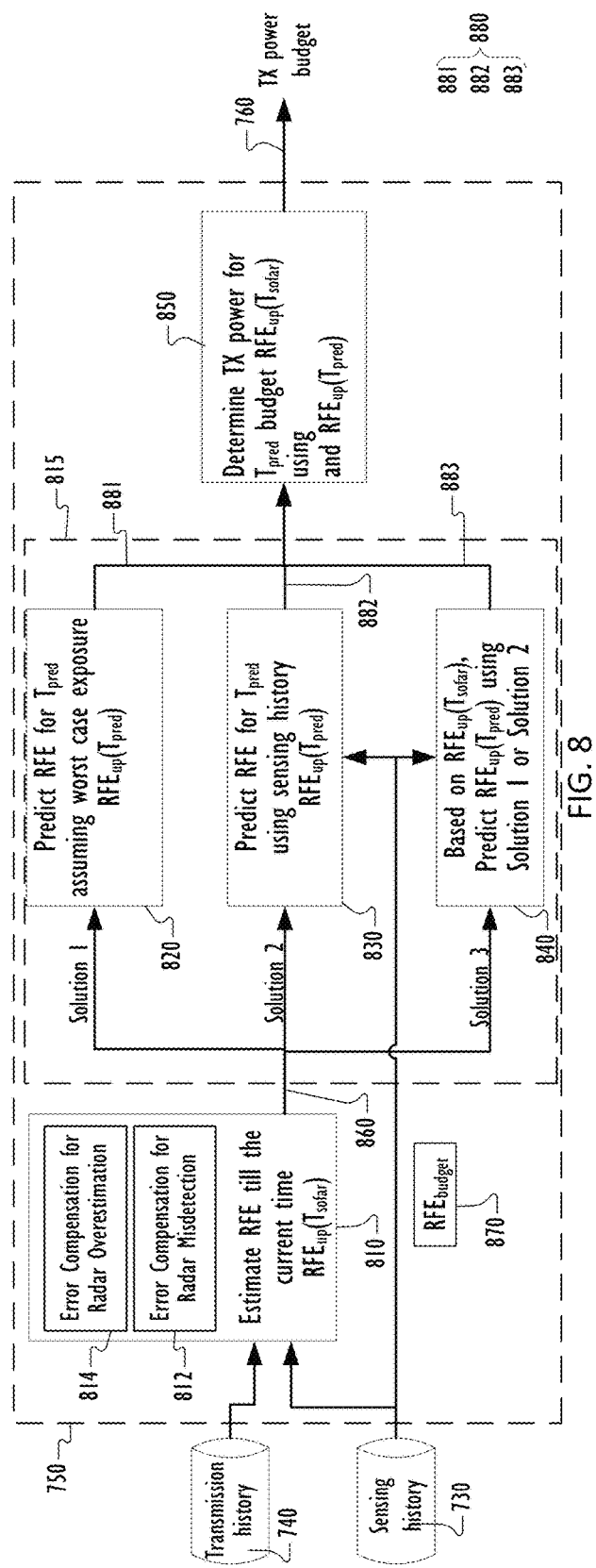
FIG. 8 illustrates functional components of the MPE manager from FIG. 7.

FIGS. 7 and 8 will be described together. FIG. 7 illustrates an example architecture of an MPE management system 700 using radar sensing in accordance with an embodiment of this disclosure. The MPE management system 700 may be designed by an engineer who made various design choices described further below. The MPE management system 700 includes a radar module 710 ("radar"), a communication module 720, radar detection data 730, transmission data 740, MPE management circuitry 750 (MPE manager), and a TX power budget 760. FIG. 8 illustrates functional components of the MPE manager 750 from FIG. 7. The embodiments of the MPE management system 700 shown in FIG. 7 and the MPE manager 750 shown in FIG. 8 are for illustration only, and other embodiments could be used without departing from the scope of this disclosure.

The MPE management system 700 performs a method (such as the method 1500 of FIG. 15) for determining the TX power budget 760 of a mobile device and for managing RFE using radar sensing results 770 in accordance with embodiments of this disclosure. The MPE management system 700, by using the radar 710 to perform radar sensing, estimates the distance from the mobile device to a body part of a human user of the mobile device, namely, the target distance R. The MPE manager 750, by choosing an appropriate TX power level allowable for a communication transmission, the performance of the communication module 720 can be enhanced while keeping the same level of RFE to the human or even reducing the RFE level. In certain embodiments, this enhanced performance of the communication module 720 can be accomplished by allowing high instantaneous TX power transmission when the radar 710 detects no target (i.e., human body parts) near the device, and allowing a limited instantaneous TX power when a target is detected close-by. The MPE limit defined in government regulations is the exposure averaged over a specified window duration, particularly, window duration that the FCC defines is a 4 second averaging time ($T_{wind}$=4 seconds) for high frequency (>6 GHz) RF exposure. Compliance with the MPE limit can be achieved although instantaneous TX power transmission may be high, such as in instances when the radar detects no target.

Figure 9:
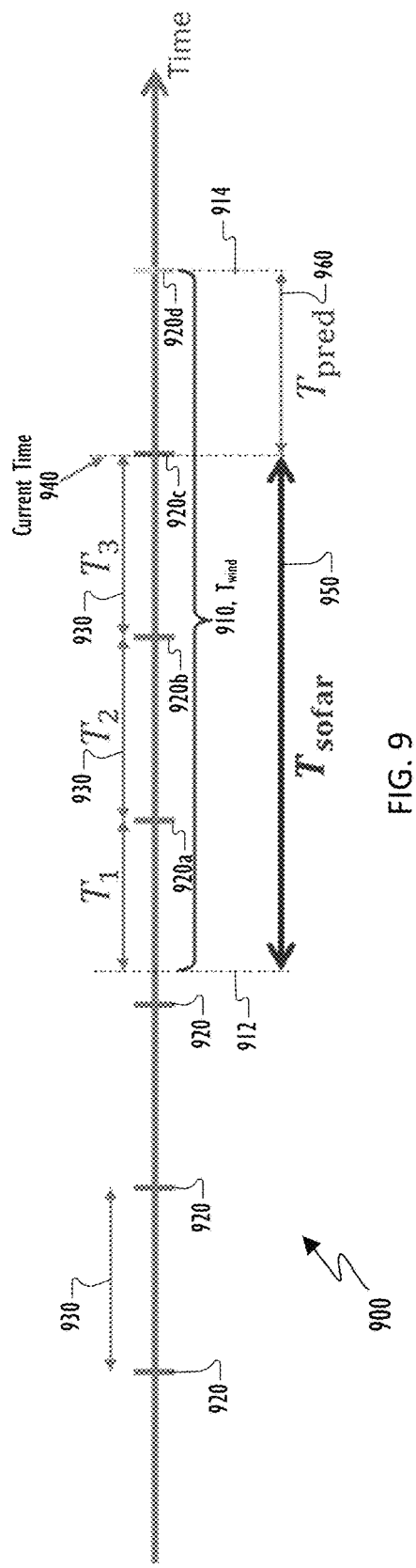
FIG. 9 illustrates a timeline including an RFE averaging window with discrete times at which radar detection updates occur in accordance with an embodiment of this disclosure.

This disclosure divides the averaging window $T_{wind}$ into two time durations, namely, a previous time period $T_{sofar}$ and a future time period $T_{pred}$. The previous time period and the future time period are defined relative to a reference point in time such as the current time. The previous time period occurs before the current time and can include the current time in some embodiments. In certain embodiments, the previous time period $T_{sofar}$ is the duration from the start of the averaging window until the current time, and the future time period $T_{pred}$ is the duration from the current time until the next radar update. In certain embodiments, the averaging window is equal to the sum of the previous and future time periods (i.e., $T_{sofar}+T_{pred}=T_{wind}$). Additional details of the averaging window $T_{wind}$ are illustrated in FIG. 9 described further below.

The radar 710 can include the radar transceiver 270 of FIG. 2 or could be the radar 500 of FIG. 5. The radar 710 can perform radar sensing periodically, such as once per second, thereby generating a radar sensing result every second. In certain embodiments, if a current radar sensing result satisfies a distance condition, the radar 710 outputs the current radar sensing result 770 but does not output the radar sensing results that does not satisfy the distance condition. For example, the distance condition is satisfied if the target distance R is greater than or equal to a threshold distance. The current radar sensing result 770 includes the measured target distance R at a current time. That is, the current radar sensing result 770 includes a measurement of the target distance R between the radar 710 and the target. The current radar sensing result 770 is recorded into a memory of the electronic device as radar detection data 730.

The radar 710 is associated with a memory storage and maintains the radar detection data 730 in the associated memory storage. The radar detection data 730 can be a database that stores radar sensing results, both the current radar sensing results 770 and the historical radar sensing results. To generate historical radar detection data, the radar 710 records the current radar sensing result 770 as radar detection data 730 into a memory of the electronic device. The historical radar sensing results include target distances sensed over a historical time period prior to the current time. The historical period can be longer than the averaging window ($T_{wind}$). Additionally, the radar sensing result 770 can include an angle estimation, indicating a direction of the target relative to the radar 710.

The communication module 720 logs its adopted transmission configuration 780 into the memory of the electronic device as transmission data 740. The adopted transmission configuration 780 includes the TX power used, the beam index used (if any), the duty cycle used, etc. The beam index identifies the beam used for the transmission. The beam used indicates the direction in which a transmission used the TX power.

The transmission data 740 can be a database or memory storage that stores current transmission configuration 780 and historical. The current transmission configuration 780 corresponds to the current time. The historical transmission configuration data includes transmission configurations used over a historical time period prior to the current time, and the historical period can be longer than the averaging window ($T_{wind}$). The update rate of the TX configuration 780 is not necessarily the same as the update rate of the radar detection (i.e., periodicity of outputting radar sensing results 770). In a typical setting, the update rate of the transmission configuration could be almost instantaneous (or can practically be assumed so), while radar detection could be performed sporadically due to a constraint on radar transmission and/or the computational cost for running the radar detection procedure.

The TX power budget 760 is a transmission margin that the MPE manager 750 generates and outputs, for example, the TX power budget 760 is output to the communication module 720. This transmission data 740 (including current and historical transmission configuration information) along with the radar detection data 730 (including current and historical radar sensing results) may be accessed by the MPE manager 750 to estimate an upper-bound RFE ($RFE_{up}$) and to derive the TX power budget 760 that would not lead to a violation of the MPE limit. Additional details of the MPE manager 750 are shown in FIG. 8.

Referring to FIG. 8, the MPE manager 750 receives radar detection data 730 and the transmission data 740 and outputs the TX power budget 760. The MPE manager 750 can be divided into two components, namely an RFE estimator 810-815 and a TX power budget calculator 850. To determine the TX power budget 760, the TX power budget calculator 850 calculates a maximum allowable RF TX power that would not cause overexposure to the human user of the electronic device, based on the RFE determined by the RFE estimator 810-815. According to this disclosure, "TX power" refers to all RF transmissions from the electronic device, including communication transmissions and the radar transmissions. This disclosure describes details of how the TX power budget calculator 850 determines the TX power budget 760. This disclosure does not describe details of how the TX power budget 760 is allocated among communication, radar, or other RF transceiving mechanisms. For ease of explanation, some embodiments of this disclosure are described as though the entirety of the TX power budget is allocated to the communication transmissions.

Generally, the RFE estimator 810-815 estimates the RFE for a time duration based on the radar detection data 730 and the transmission data 740. Specifically, the RFE estimator 810-815 estimates the upper-bound RFE ($RFE_{up}$) for the averaging window $T_{wind}$ in two parts: one part for what already happened so far in the averaging window up to the current time (i.e., $RFE_{up}$ for the previous time period $T_{SoFar}$), and the other part for the not-yet-known future in the averaging window until the next radar detection update (i.e., $RFE_{up}$ for the future time period $T_{pred}$). Corresponding the division of the averaging window $T_{wind}$ into two time periods $T_{SoFar}$ and $T_{Pred}$, the RFE estimator 810-815 can be divided into two components: an RFE estimator 810 and an RFE predictor 815. The RFE estimator 810 estimates the RFE for a previous time period $T_{SoFar}$ of the averaging window $T_{wind}$, which is referred to as the "previous RFE" 860 and as $RFE_{up}$. Particularly, based on historical data from both the radar detection data 730 and transmission data 740, the RFE estimator 810 estimates the previous RFE that accumulated onto a target during the previous time period $T_{sofar}$. The RFE predictor 815 estimates (particularly, predicts) a potential RFE on the target to occur during a future time period $T_{pred}$ of the averaging window $T_{wind}$, which is referred to as the "future RFE" 880 and as $RFE_{prediction}$. The RFE predictor 815 can be a first RFE predictor 820, second RFE predictor 830, or third RFE predictor 840, as this disclosure provides multiple algorithms for predicting the future RFE to occur on the target. The differences among the multiple algorithms (corresponding to the RFE predictors 820, 830, and 840) are in how to manage the future RFE during the future time period $T_{pred}$. The future RFE 880 could be a first future RFE 881, second future RFE 882 and third future RFE 883 are output from the first, second, and third RFE predictors 820, 830, and 840, respectively.

The MPE manager 750 is designed based on assumption that the electronic device 200 does not operate under conditions that are free of risk, but instead operates under practical conditions with some risks of error. One example type of error is radar misdetection, which occurs when the radar 710 fails to detect the presence of a human target. Another type of error is radar overestimation of the target's range (e.g., distance to a body part), which occurs when the target is actually located closer to the radar 710 than the target distance R measured by the radar. The MPE manager 750 estimates an upper-bound RFE to compensate for the practical conditions in which the radar 710 cannot detect with 100% accuracy.

Additional details of the RFE estimator 810 will now be described. With proper design choices for the radar detection, radar misdetection can be suppressed to a low value, though not a zero probability. As a design choice to compensate for radar misdetection, the RFE estimator 810 can include a first compensator 812 that enables the RFE estimator 810 to: (i) identify radar misdetections to be suppressed; (2) determine a low value to which the identified radar misdetections will be suppressed; and (3) suppress the identified radar misdetections down to the determined low value. First, to identify how many radar misdetections to suppress, the RFE estimator 810 obtains an upper bound of a rate of misdetection $\delta$, which could be obtained via an experimental evaluation or some other evaluation of the radar design choice. From among a total number N of radar detection updates (920) that have occurred during the previous time period $T_{SoFar}$, the RFE estimator 810 assumes a subset of M radar detection updates are misdetections. Equation 10 denotes the number of misdetections M as a ceiling function that is based on the misdetection rate $\delta$. Second, the RFE estimator 810 determines that $RFE_{sur}(T_n)$, which denotes a surface RFE value for an assumption that a surface of the electronic device is in physical contact with the target for a duration of the radar update interval $T_n$, is the low value to which the identified radar misdetections will be suppressed.

$$M = \lceil N \times \delta \rceil \tag{10}$$

Third, the RFE estimator 810 suppresses the effect of radar misdetection by estimating the upper-bound RFE according to Equation 11, where $\mathcal{M}$ denotes the set of indices of the radar update durations with the lowest RFE estimate, $RFE_n^{max}(T_n)$ denotes the $n^{th}$ largest RFE estimate among the N radar detection update durations, and $RFE_{sur}(T_n)$ denotes a surface RFE value for an assumption that a surface of the electronic device is in physical contact with the target for a duration of the radar update interval $T_n$. According to Equation 11, the RFE estimator 810 suppresses the misdetection of the radar by utilizing $RFE_{sur}(T_n)$ as a replacement of the M radar update intervals having the lowest RFE estimate. These RFE estimates (shown in Equation 11) do depend on the TX power adopted by the communication module 720 and other RF signal transmitters (e.g., including the radar 710 itself) for the respective time duration, but Equation 11 does not explicitly show them in order to avoid clutter in the notation. Estimating the upper-bound RFE according to Equation 11 is just one example design choice, and other variations could be introduced and may have different levels of conservativeness in estimating the upper-bound RFE.

$$RFE_{up}(T_{sofar}) \leq \sum_{n=1}^{N-M} RFE_n^{max}(T_n) + \sum_{m \in \mathcal{M}} RFE_{sur}(T_m) \tag{11}$$

As another design choice, the RFE estimator 810 includes a second compensator 814 that compensates for the possible overestimation of the target's range. An example of the overestimation error is when the radar 710 outputs a radar sensing result 770 that includes a target distance R=10 centimeter, but the location of the target is actually 5 centimeters away from the radar 710. Root causes of this overestimation error include the intrinsic overestimation of the radar's 710 range estimation algorithm, and the uncertainty of the target's movement during the radar update interval $T_n$, especially when $T_n$ is not relatively small (e.g., longer than a threshold interval). For any radar range estimation algorithm, there is an associated range estimation error that could be positive or negative. A negative range estimation error means that the target distance R (i.e., range estimate) is larger than the actual distance to the target, which means an overestimation of the target distance. This negative range estimation error can result in underestimation of the RFE for the corresponding duration $T_n$. From among the current and historical target distances stored in the radar detection data 730, the second compensator 814 selects at least one target distance R as candidates for compensation. In certain embodiments, each target distance of every radar update (i.e., each $T_n$) are the candidates for compensation, and there is no need for the second compensator 814 to choose candidates for compensation. Within the second compensator 814, an offset value $\Delta r$, which is associated with compensation for the radar range overestimation error, is subtracted from the selected candidates (i.e., selected radar measurements of the target distance R).

The uncertainty of the target's movement during the radar update interval $T_n$ stems from the fact that the radar's 710 signals for sensing and detection of a target are processed at discrete times 920, and the radar 710 outputs only one update of the radar detection result 770 for the corresponding radar detection interval $T_n$. The movement of the target during this radar detection interval $T_n$ might not be negligible when $T_n$ is not relatively small (for example, $T_n$ is longer than a few millisecond).

Embodiments of this disclosure assume that the design choices of the radar detection function performed by the radar 710 account for these root causes of overestimation of the target's range and provide a lower bound of the estimate of the target distance R. In summary, embodiments of this disclosure assume that the design choice of the RFE estimator 810 has accounted for these root causes of overestimation of the target's range, and that the RFE estimator 810 generates upper-bound RFE estimates that are greater than the actual RFE on the target. The RFE estimator 810 seeks to measure the accumulated previous RFE as accurately as practically possible, but in an abundance of safety precautions, compensates for potential errors by generating a previous RFE estimation that is greater than the actual exposure impinged upon a human target (i.e., overestimating the previous RFE).

The MPE manager 750 predicts the future RFE such that a sum of the estimated previous RFE and the predicted future RFE does not exceed the MPE limit for the averaging window. More particularly, to ensure that the sum does not exceed the MPE limit, the MPE manager 750 predicts the future RFE as well as calculates an RFE budget 870 (illustrated as $RFE_{budget}$). The RFE budget is how much more RFE can be tolerated (e.g., impinged upon the human target) during the future time period $T_{pred}$ before reaching the MPE. In other words, the RFE budget is the RFE that could be allowed to impinge on the human target during the future time period $T_{pred}$ that is from the current time until the next radar detection update. Computation of the RFE budget is described further below with reference to block 1020 of FIG. 10. The predicted future RFE is the amount of exposure the human target would experience assuming the electronic device transmits RF energy at a reference transmit power $P_0$ for the duration of the future time period $T_{pred}$. The actual TX power that electronic device (e.g., transceivers 210 or communication module 720) outputs during the future time period $T_{pred}$ is unknown at the current time, so the MPE manager 750 assumes a reference transmit power $P_0$ for the duration of the future time period $T_{pred}$.

Additional details of the RFE predictor 815 will now be described. The first RFE predictor 820 predicts the future RFE based on an assumption that a surface of the electronic device will be in physical contact with the target for a duration of the future time period, namely, an assumption of a worst-case exposure. The first RFE predictor 820 uses radar detection data 730 and transmission data 740 to assess the RFE for the previous time period up till the current time. Based on the future RFE received from the first RFE predictor 820, the TX power budget calculator 850 determines the TX power budget 760 as the allowable RF exposure budget for a future time period (which can be translated into the TX power budget for that duration $T_{pred}$) based on the assumption of worst-case exposure.

The second RFE predictor 830 predicts the future RFE for a certain duration into the future based on sensing history from the radar detection data 730. The MPE manager 750 determines bounds of the location of the target based on both a current location and a speed of the target, based on sensing history from the radar detection data 730. Based on the radar detection data 730 and the future RFE received from the second RFE predictor 830, the TX power budget calculator 850 determines the TX power budget 760. The algorithm implemented by the second RFE predictor 830 provides a tighter estimate of the future RFE and can allow a more aggressive choice of the TX power budget. The second RFE predictor 8300 is less conservative compared to the first RFE predictor 820 because the algorithm of the second RFE predictor 830 is associated with more risk for error, but this risk for error can be managed by appropriate selection of the operational RFE and/or the compensations for radar detection errors described above.

The third RFE predictor 840 predicts the future RFE using a selected algorithm, selected from among the first algorithm of the first RFE predictor 820 and the second algorithm of the second RFE predictor 830. That is, the third RFE predictor 840 implements a hybrid solution (illustrated as "Solution 3") between the first and second algorithms, which are illustrated as "Solution 1" and "Solution 2," respectively. Particularly, when the previous RFE accumulated till the current time is close to the exposure limit (e.g., MPE limit), the third RFE predictor 840 selects to implement the first algorithm of the first RFE predictor 820 by assuming the worst-case exposure for the $T_{pred}$ and outputs a conservative TX power budget 760. Alternatively, when the previous RFE accumulated till the current time not high (i.e., not close to the exposure limit), the third RFE predictor 840 selects to implement the second algorithm of the second RFE predictor 830 by using recent radar detection data 730 to predict the future RFE. The third RFE predictor 840 is less conservative compared to the first RFE predictor 820 because the algorithm of the third RFE predictor 840 is associated with more risk for error, but this risk for error is managed more by the third RFE predictor 840 than by the second RFE predictor 830 because the third RFE predictor 840 chooses to perform the prediction based on radar detection history (i.e., the approach of the second RFE predictor 830) only when the previous RFE estimated at the current time is low relative to the exposure limit (e.g., MPE limit).

The MPE manager 750, using the TX power budget calculator 850, determines the TX power budget 760 based on the RFE budget ($RFE_{budget}$) and the future RFE ($RFE_{prediction}$), which is obtained from the RFE predictor 815. In certain embodiments, the TX power budget 760 is a maximum allowable TX power $P_t$ for the future time period $T_{pred}$, which is calculated according to Equation 13

$$P_t = P_0 + 10\log_{10}\left(\frac{RFE_{budget}}{RFE_{Prediction} * P_0}\right) \quad (13)$$

The TX power budget calculator 850 can determine the TX power budget 760 in three different ways, depending on whether the future RFE is predicted based on the first, second, or third algorithm corresponding to the RFE predictors 820, 830, 840, respectively. Each of the three algorithms enables the MPE manager 750 to satisfy the following two objectives to varying degrees. According to the first objective (Objective 1), the choices of TX power budget should not cause the RFE to exceed the MPE limit during the future time period $T_{pred}$. According to the second objective (Objective 2), the choices of TX power budget should ensure that there is no transmission interruption for future averaging windows. The fact that the RFE is computed within a current averaging window $T_{wind}$, this second objective can be simplified to ensuring that there is no interruption of transmission for the duration of one averaging window into the future from the current time. In certain embodiments, the MPE manager 750 seeks to satisfy a third objective (Objective 3) that is to maximize the communication performance (e.g., throughout).

FIG. 9 illustrates a timeline 900 including an RFE averaging window 910 (illustrated as $T_{wind}$) with discrete times 920 at which radar detection updates occur in accordance with an embodiment of this disclosure. That is, the discrete times 920 at which the radar 710 performs radar detection are spaced apart by a radar update interval 930. The embodiment of the timeline 900 shown in FIG. 9 is for illustration only, and other embodiments could be used without departing from the scope of this disclosure.

The averaging window 910 for RFE estimation begins at a start point 912 and ends at an end point 914. An averaging window 910 for RFE estimation includes a certain number of radar detection updates. As an example, this timeline 900 includes three radar detection updates (920a-920c) within the averaging window 910, including the update at the 'current time' 940. As introduced above, a previous time period 950 (illustrated as $T_{SoFar}$) and a future time period 960 (illustrated as $T_{pred}$) are defined within the averaging window 910. In this example, the current time 940 is the end of the previous time period 950 and the start of the future time period 960. The previous time period 950 starts at the start point 912 of the averaging window 910. The future time period 960 ends at the end point 914 of the averaging window 910. As an example, the averaging window 910 can be 4 seconds corresponding to the MPE limit for high frequency (>6 GHz) RF exposure. In this example, the end point 914 of the averaging window 910 is the same as the time 920d of a radar detection update.

At each time 920 after the radar update interval 930 elapses, the radar 710 transmits pulses, and the radar 710 processes multiple pulses together to generate one radar sensing result 770. By processing of multiple radar pulses, the radar 710 provides more capability and/or more reliability for radar detection. In certain embodiments, the radar 710 updates the radar detection data 730 at the discrete times 920 by outputting new radar sensing results 770.

Figure 10:
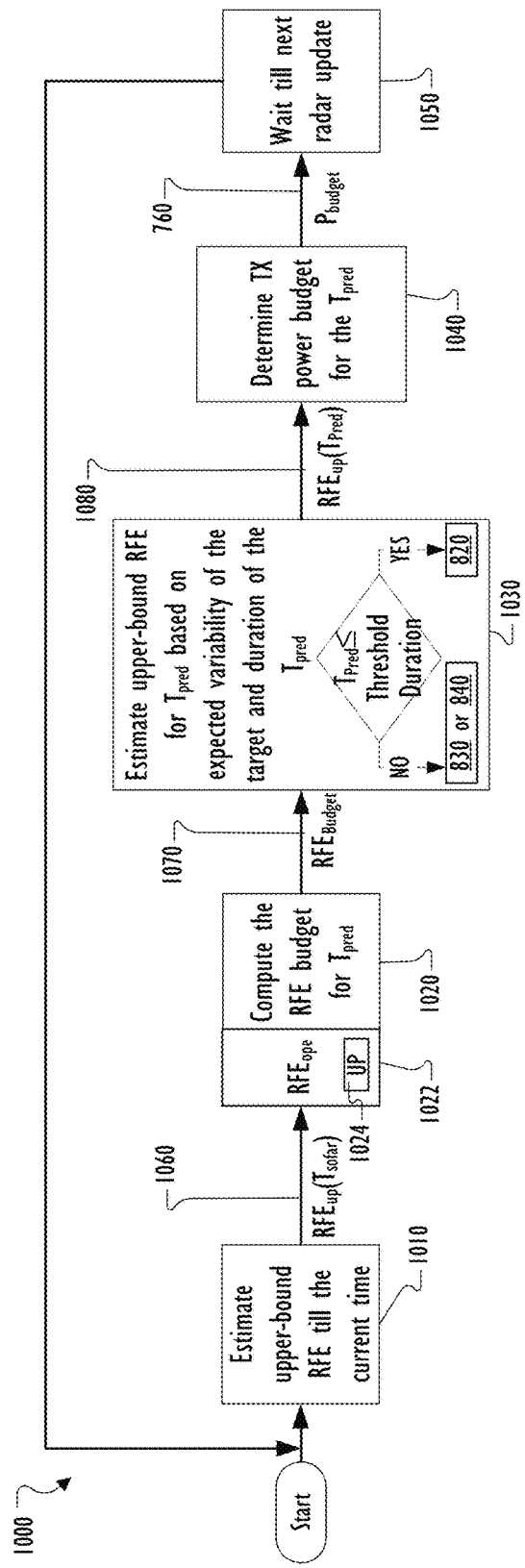
FIG. 10 illustrates a method for managing RFE using radar sensing results in accordance with embodiments of this disclosure.

FIG. 10 illustrates a method 1000 for managing RFE using radar sensing results 770 in accordance with embodiments of this disclosure. The method 1000 is performed by the MPE manager 750 shown in FIGS. 7 and 8. The method 1000 starts at the current time 940 and includes block 1010-1050. The embodiment of the method 1000 shown in FIG. 10 is for illustration only, and other embodiments could be used without departing from the scope of this disclosure.

At block 1010, the RFE estimator 810 estimates an upper-bound RFE for the previous time period 950, which is the previous RFE 1060 illustrated as $RFE_{up}(T_{SoFar})$. The previous RFE 1060 can be the same as the previous RFE 860 of FIG. 8. The procedure that the RFE estimator 810 performs at block 1010 can be the same as or similar to the procedures that the RFE estimator 810 performs in FIG. 8. That is, estimating this upper-bound RFE (1060) may include accounting for possible radar misdetection as well as potential overestimation of the target range. As an example, based on the three radar detection updates (920) and the TX configuration 780 adopted for the previous time period 950, the RFE estimator 810 estimates the exposure impinged on the human target during the previous time period 950. After obtaining $RFE_{up}(T_{sofar})$, the method 1000 proceeds to block 1020.

At block 1020, the MPE manager 750 computes an RFE budget 1070 for the future time period 960, which is illustrated as $RFE_{Budget}$. That is, the MPE manager 750 computes how much RFE budget remains before reaching the MPE limit for the current averaging window 910, as shown in Equation 14, where $RFE_{ope}$ denotes an operational RFE, $RFE_{up}(T_{sofar})$ represents the previous RFE, and f is a function of both $RFE_{ope}$ and $RFE_{up}(T_{sofar})$ The RFE budget 1070 can be the same as the RFE budget 870 of FIG. 8. In certain embodiments, computing the RFE budget 1070 for the future time period 960 includes determining the operational RFE ($RFE_{ope}$) at block 1022.

$$RFE_{budget} = f(RFE_{ope}, RFE_{up}(T_{sofar})) \quad (14)$$

At block 1022, the MPE manager 750 determines the operational RFE ($RFE_{ope}$) for operating the TX power budget calculator 850. This $RFE_{ope}$ is the RF exposure level that the MPE manager 750 aims to maintain, for example, the TX power budget calculator 850 operates aiming to accumulate $RFE_{ope}$ or less as a total exposure impinged upon the human user during the averaging window 910. The actual RFE impinged upon the human user can be lesser or greater than $RFE_{ope}$ during transition periods (for example, due to movements of the target), but actual RFE impinged upon the human user would converge to $RFE_{ope}$ or less in a steady state situation. The MPE manager 750 determines the $RFE_{ope}$ based on at least two considerations: (1) a margin in the RFE (such as from the MPE limit to the $RFE_{ope}$) to compensate for radar range estimation error during the future time period 960 will increase safety to the user; and (2) user preference 1024 in the RFE level that is desired by (e.g., emotionally comfortable to) the user. Some users may be people who prefer their exposure to RF energy to be lower than the MPE limit, which is a maximum RF exposure allowed by government regulations, due to the users having a perception of the health risk of RF exposure. In certain embodiments, there is no requirement for the RFE impinged upon the human to reach the $RFE_{ope}$, and the MPE manager 750 aims to maintain the RFE impinged upon the human less than the $RFE_{ope}$. For example, if there is no target in close proximity to the radar the whole averaging window, then the actual RFE impinged could be close to 0, and this is an operation allowed by the MPE manager 750.

The potential errors associated with radar sensing affect the previous time period 950 and affect radar sensing results 770 for other time periods, including the future time period 960. To compensate for possible radar detection error, the MPE manager 750 determines an upper-bound RFE for the previous time period 950 and determines another upper-bound RFE for the future time period 960, which is a rather subtle distinction to the description of time periods. However, the RFE estimator's 810 algorithm to determine $RFE_{up}$ ($T_{SoFar}$) and the RFE predictor's 815 algorithm to determine $RFE_{up}(T_{Pred})$ are algorithms that are distinct beyond having different time periods. As a distinction, the transmission data 740 (including adopted transmission configuration 780) enables the MPE manager 750 to know the TX power and the resulting exposure corresponding to previous time period 950, but the exposure corresponding to the future time period 960 is not-yet-known, and the TX power that the transceivers 210 actually emit after the current time 940 is not-yet-known.

Under conditions that are free of risk, if the locations of the target are predicted accurately for future time period 960, and if an objective (e.g., Objective 3) is to maximize the communication performance, then the MPE manager 750 could set $RFE_{ope} = RFE_{lim}$, where $RFE_{lim}$ is the MPE limit specified by the government regulation. However, under practical conditions, there is some uncertainty in the prediction of locations of the target for future time period 960. Because the government regulation does not allow overexposure above the MPE limit, the MPE manager 750 determines the $RFE_{ope}$ such that the actual RFE impinged upon the human user will not exceed the MPE limit ($RFE_{lim}$) even when there is some error in the prediction of locations of the target for future time period 960 while operating the TX power budget calculator 850. Therefore, in order to compensate for the practical conditions in which the radar 710 cannot detect with 100% accuracy during the future time period 960, the MPE manager 750 determines the $RFE_{ope}$ by providing a margin from the MPE limit to the $RFE_{ope}$. In certain embodiments, the MPE manager 750 determines the $RFE_{ope}$ by selecting from optional choices of $RFE_{ope}$ to combat this prediction error (i.e., radar range estimation error), wherein the optional choices of $RFE_{ope}$ could depend on which RFE predictor (from among the first, second, and third RFE predictors 820, 830, and 840 in FIG. 8) is utilized by the TX power budget calculator 850.

The user preference 1024 indicates a comfortability level to RF exposure. Note that by regulation, it is deemed that any exposure below $RFE_{lim}$ is considered safe, but different users may have different perceptions of the health risk of RF exposure. The user preference 1024 also indicates balancing (or tradeoffs) between the communication performance and the exposure level the user is comfortable with. Generally, a reduction of human exposure to RF energy is coupled to a reduction of communication performance due to reduced TX power, reduced power density, or widened beams. In certain embodiments, the MPE manager 750 determines the $RFE_{ope}$ based on the user preference 1024. For example, the MPE manager 750 can determine the $RFE_{ope}$ based on both the possible error in predicting the RFE during the future time period 960 and the user preference 1024. In certain embodiments, the MPE manager 750 includes a user-adjustable setting that enables a user of the electronic device 200 to control the $RFE_{ope}$ by inputting the user preference 1024.

In one implementation, the MPE manager 750 provides three optional comfortability levels regarding the user's level of risk-aversion to RF exposure, such as: (1) Not worried at all (set $RFE_{ope} = RFE_{lim}$); (2) Moderately worried (set $RFE_{ope} \leq RFE_{lim}$ such that $RFE_{ope}$ is set to a moderate value); and (3) Very worried (set $RFE_{ope} \leq RFE_{lim}$ such that $RFE_{ope}$ is set to a low value). According to the third optional comfortability level, by setting $RFE_{ope} \leq RFE_{lim}$ such that $RFE_{ope}$ is set to a low value, the MPE management system 700 only allows the transceivers 210 to transmit high TX power when no body part is nearby (e.g., when no body part within the field-of-view 510 of FIG. 5). Further according to the third optional comfortability level, the MPE management system 700 would become more conservative when a body part is nearby, such that the transceivers 210 are allowed to transmit a moderate TX power (e.g., MPE management curve 602 of FIG. 6) that is greater than the TX power of a conventional no-sensing communication module. As an example, the MPE management system 700 can determine that a body part is nearby when a body part is located 10 centimeters from the electronic device or closer but is not touching a surface of the electronic device. The baseline curve 604 of FIG. 6 is an example of the TX of a conventional no-sensing a very conservative technique that does not use any sensing to detect the presence of a human or distance to a human body part, and thus operates under an assumption that a human body part is always on the surface of the electronic device. This flexibility of setting $RFE_{ope}$ to different values can be provided as a preference setting to the user.

At block 1030, the RFE predictor 815 estimates an upper-bound RFE for the future time period 960, which is the future RFE 1080 illustrated as $RFE_{up}(T_{Pred})$. The future RFE 1080 can be the same as the future RFE 880 of FIG. 8. Depending on the expected variability of the target distance (e.g., predictability of the location of the target) and the length of the future time period 960, the radar sensing results 770 generated during the previous time period 950 (i.e., at times 920a-920c) up to the current time 940 may or may not be used for predicting the future RFE for the future time period 960. If the future time period 960 is relatively short (for example, a small fraction of a second, or shorter than a threshold duration), then the location of the target can be predicted from the latest radar detection with a reasonable degree of reliability, and thus the MPE manager 750 determines (using second RFE predictor 830 or third RFE predictor 840) the future RFE based on the radar sensing results 770 generated during the previous time period 950.

If the future time period 960 is relatively long (for example, longer than a threshold duration), then the locations of the target cannot be predicted reliably, and thus the MPE manager 750 determines that it is safer to assume a worst-case exposure (i.e., the exposure level when a body part is touching the surface of the electronic device) for the future time period 960. By assuming the worst-case exposure for the future time period 960, the RFE predictor 815 does not predict the future RFE based on the radar sensing results 770 generated during the previous time period 950. Instead, the future RFE is predicted (using first RFE predictor 820) based on (i) a surface RFE value ($RFE_{Sur}$) for an assumption that a surface of the electronic device will be in physical contact with the target for a duration of the future time period 960 and (ii) a reference transmit power density.

At block 1040, the TX power budget calculator 850 determines the TX power budget 760. The procedure that the TX power budget calculator 850 performs at block 1040 can be the same as or similar to the procedures that the TX power budget calculator 850 performs in FIG. 8.

At block 1050, the MPE manager 750 waits for the time 920 of the next radar update. In the example shown in FIG. 9, based on the three radar detection updates (920) that occurred so far in the averaging window 910, the MPE manager 750 waits for the end point 914 of the averaging window 910, which is at the same time 920 as the next radar update.

Figure 11:
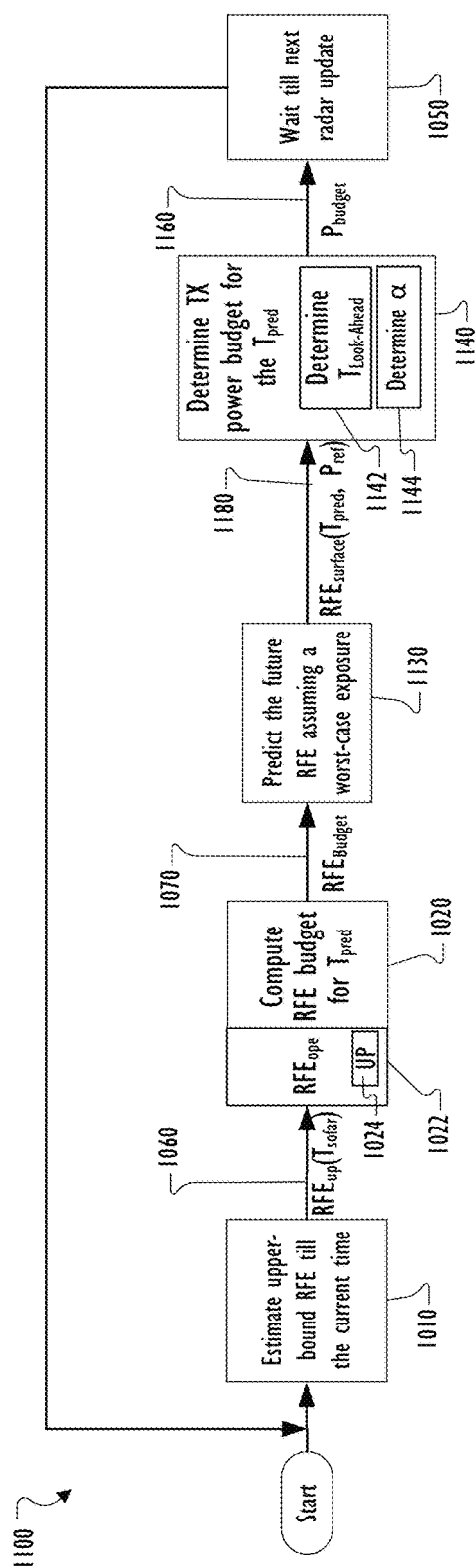
FIG. 11 illustrates a method for managing RFE based on a determination to disregard radar sensing results and assume that a surface of the electronic device will be in physical contact with the target for a duration of the future time period in accordance with embodiments of this disclosure.

Although FIG. 10 illustrates one example method 1000 for managing RFE using radar sensing results, various changes can be made to FIG. 10. For example, the method 1100 in FIG. 11 is a first variation of the method 1000 of FIG. 10, in which blocks 1030 and 1040 are replaced by blocks 1130 and 1140. Particularly, the future RFE 1080 predicted at block 1030 of FIG. 10 could be any among the first, second or third future RFEs 881-883 generated by the first, second, or third RFE predictors 820, 830, or 840, respectively. However, in comparison, the future RFE 1180 predicted at block 1130 of FIG. 11 is generated by the first RFE predictor 820 that implements a first algorithm based on an assumption of a worst-case exposure and is the same as or similar to the first future RFE 881 of FIG. 8.

FIG. 11 illustrates a method 1100 for managing RFE based on a determination to disregard radar sensing results 770 and assume that a surface of the electronic device will be in physical contact with the target for a duration of the future time period in accordance with embodiments of this disclosure. In certain embodiments, a determination to disregard radar sensing results 770 includes disregarding the radar detection update that occurs at the current time.

The method 1100 is performed by the MPE manager 750 shown in FIGS. 7 and 8. The method 1100 starts at the current time 940. To avoid duplicative descriptions, the method 1100 includes blocks 1010, 1020, 1022, and 1050 from FIG. 10. The method 1100 additionally includes blocks 1130 and 1140, as described below. The method 1100 implements a conservative algorithm for predicting the future RFE corresponding to the future time period 960 ($RFE_{pred}(T_{pred}, P_{ref})$) that ensures no underestimation of the RFE occurs. The embodiment of the method 1100 shown in FIG. 11 is for illustration only, and other embodiments could be used without departing from the scope of this disclosure.

At block 1020, the MPE manager 750 computes an RFE budget 1070 for the future time period 960, which is illustrated as $RFE_{Budget}$. As a particular example, the MPE manager 750 computes the RFE budget according to Equation 15.

$$RFE_{budget} = f(RFE_{ope}, RFE_{up}(T_{sofar})) = RFE_{ope} - RFE_{up}(T_{sofar}) \quad (15)$$

At block 1130, the first RFE predictor 820 predicts the future RFE 1180 based on an assumption that a surface of the electronic device will be in physical contact with the target for a duration of the future time period, namely, an assumption of a worst-case exposure. The first RFE predictor 820 assumes a reference transmit power $P_{ref}$ for the duration of the future time period $T_{pred}$. $P_{ref}$ can be an assumption for Tx power density. In certain embodiments, $P_{ref}$ is not actually transmitted during the future time period 960, and thus can be set to any value, such as a number that is convenient for calculation, e.g., $P_{ref}=0$ dBm. To determine the future RFE 1180, namely, $RFE_{pred}(T_{pred}, P_{ref})$, the first RFE predictor 820 uses Equation 16, where $RFE_{sur}(T_{pred}, P_{ref})$ denotes the RFE when there is a target touches the surface of the electronic device surface for the whole duration $T_{pred}$ 950 and the electronic device transmits at $P_{ref}$ for the whole duration $T_{pred}$.

$$RFE_{pred}(T_{pred}, P_{ref}) = RFE_{sur}(T_{pred}, P_{ref}) \quad (16)$$

At block 1140, the TX power budget calculator 850 determines the TX power budget 1160 ($P_{budget}$) by using Equation 17, where $P_{budget}$ and $P_{ref}$ are on the dB scale, and $T_{look-ahead}$ represents a parameter that is greater than or equal to $T_{pred}$ In certain embodiments, determining the TX power budget 1160 ($P_{budget}$) includes determining a window extension parameter (illustrated as $T_{Look-Ahead}$) at block 1142.

$$P_{budget} = P_{ref} + 10\log_{10} \frac{RFE_{budget} \frac{T_{pred}}{T_{look-ahead}}}{RFE_{sur}(T_{pred}, P_{ref})} \quad (17)$$

At block 1142, the TX power budget calculator 850 determines the window extension parameter ($T_{Look-Ahead}$). In the method 1100, due to the assumption of the worst-case exposure in terms of the target location for the future time period 960, the Objective 1 is always satisfied. The Objective 2 is satisfied to a satisfaction level that depends on the value of $T_{look-ahead}$. The value of $T_{look\_ahead}$ can be used to modify the likelihood that Object 2 is satisfied. For example, if $T_{Look-Ahead}$=0.1 seconds beyond the end point 914, then the RFE budget is spread over a duration that extends 0.1 seconds longer than the averaging window 910 ($T_{wind}$), such that in effect, the RFE budget corresponds to an extended window of time (e.g., a future time period that is extended) 0.1 seconds longer than $T_{pred}$ 960.

Further at block 1142, determining the window extension parameter ($T_{Look-Ahead}$) includes seeking a good balance or tradeoff between Objective 1 and Objective 2. Particularly, using a large $T_{look-ahead}$ value ($T_{look-ahead}$>>$T_{pred}$) means that the $RFE_{budget}$ is split for at least $T_{look-ahead}$, so that the MPE manager 750 can guarantee that TX communication can continue compliance with the MPE limit for at least $T_{look-ahead}$ into the future regardless of movement of the human target (i.e., updates to the target distance R). Therefore, an increase of $T_{look-ahead}$ increases the likelihood that Objective 2 is satisfied. However, using a large $T_{look-ahead}$ value also causes a reduction in $P_{budget}$.

Figure 12:
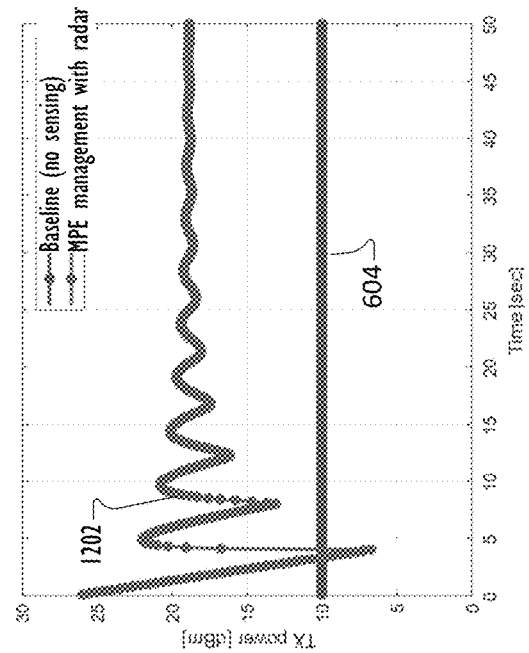
FIG. 12 illustrates an example of oscillation of TX power at the start of transmission in accordance with embodiments of this disclosure.

Another perspective is that using a small $T_{look-ahead}$ value means that the MPE manager 750 takes an aggressive choice to compute the TX power budget 1160, such that the MPE manager 750 can allow a high TX power budget in a good condition (e.g., conditions in which the presence of body part nearby the radar happens rarely). This aggressive choice also means that the MPE manager 750 can expect a large swing in the TX power budget when the condition changes (e.g., changes to conditions in which the body part is detected nearby the radar more often). FIG. 12 provides an example of the large swing in the TX power budget that the MPE manager 750 can expect.

Temporarily referring to FIG. 12, which illustrates an example of oscillation of TX power at the start of transmission at time 0. In this example, the location of the human target is actually 10 centimeters away from the radar 710 during the whole simulation duration (e.g., 50 seconds). The curve 1202 represents the TX power budget 1160. The time 0 corresponds a condition in which there is no exposure, for example, a human target is not in the field of view 510. This may be the case if the transmitter was powered off prior to time 0 and switched to power on at time 0.

The curve 1202 includes a first swing dropping from an initial high point that is greater than 25 dBm to a low point that is less than the baseline curve 604 (same as in FIG. 6), and a rising to a second high point that is in a range between 20-25 dBm. Such a large swing in the TX power budget might make it difficult for a practical communication power allocation scheme to fully exploit it, for example, the communication module 720 might not be capable of changing the adopted transmission configuration 780 as quickly as the curve 1202 swings. This is another perspective that the TX power budget calculator 850 considers at block 1142 (FIG. 11) when determining or adjusting $T_{look-ahead}$.

Now refer back to the method 1100 of FIG. 11. To protect against allowing TX power budget that is too high at start-up time (e.g., when transmission just starts; time 0 of FIG. 12), at block 1020, the MPE manager 750 can apply an upper limit on the allowable choices of the RFE budget. For example, at block 1144, the MPE manager 750 determines an adjustment factor α, which is used to calculate the RFE budget 1070 for the future time period 960 according to Equation 18, where $T_{wind}$ denotes the averaging window length, and the adjustment factor is greater than 1 (α>1). The upper limit on the allowable choices of the RFE budget is represented by the min( ) function within Equation 18.

$$RFE_{budget} = \min\left(RFE_{ope} - RFE_{up}(T_{sofar}), \alpha RFE_{ope} \frac{T_{pred}}{T_{wind}}\right) \quad (18)$$

Further at block 1144, the MPE manager 750 can select to allow a more aggressive choice of the TX power budget 1160 at the start-up time of the transmission, for example, by setting a large α value. If the α value is too large, then the resulting TX power budget 1160 may overshoot in the RFE (e.g., the baseline curve 604 in FIG. 12) at the beginning of the transmission, which may result in substantial oscillations in the TX power budget that is needed to avoid unsafe exposure (i.e., needed to maintain the overall RFE within the MPE limit). Therefore, the MPE manager 750 aims to select an appropriate a that will result in a stable TX power budget 1160, which would result in a smooth TX power budget curve.

Although FIG. 11 illustrates an example method 1100 for managing RFE based on a determination to disregard radar sensing results 770 and assume the worst-case exposure ($RFE_{sur}$), various changes may be made to FIG. 11. For example, while shown as a series of steps, various steps in FIG. 11 could overlap, occur in parallel, occur in a different order, or occur any number of times. As a particular example, the procedures of determining the adjustment factor α performed at block 1144 could occur prior to or could overlap with the procedures of block 1020 for calculating the RFE budget 1070.

Figure 13:
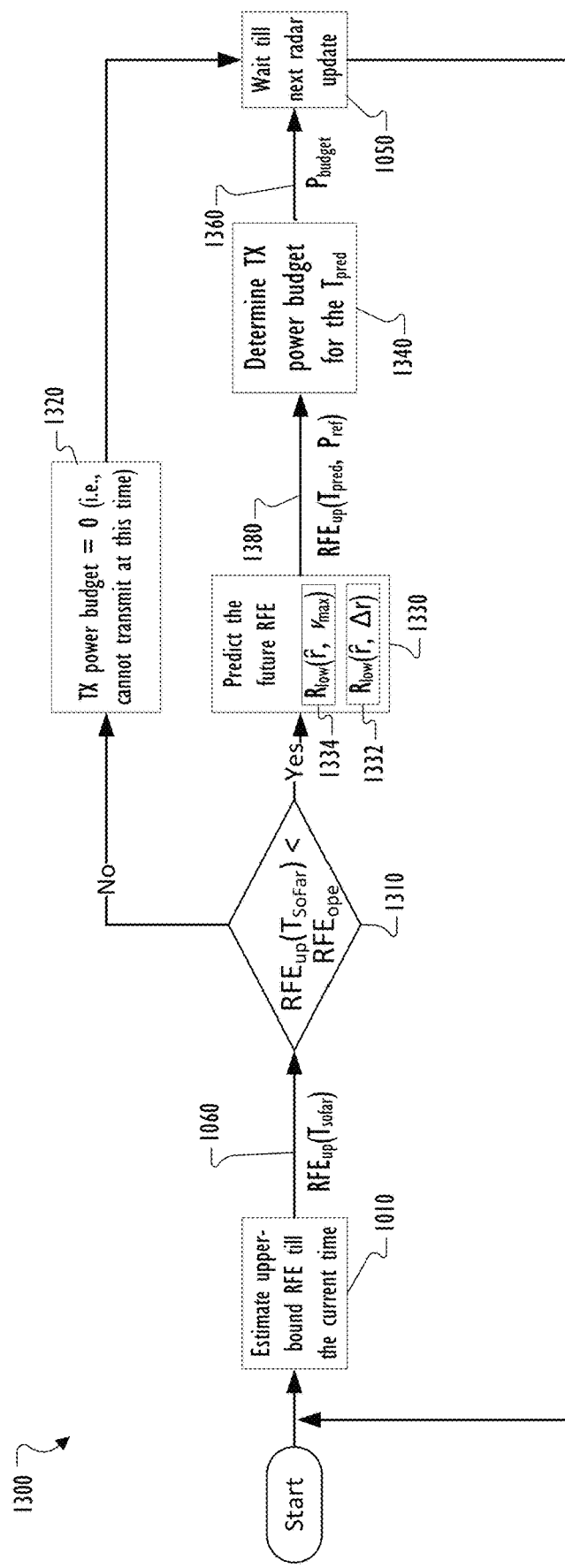
FIG. 13 illustrates a method for managing RFE based on a TX power budget that is computed based on radar detection that correspond to the previous time period, in accordance with embodiments of this disclosure.

FIG. 13 illustrates a method 1300 for managing RFE based on a TX power budget that is computed based on radar detection that correspond to the previous time period, in accordance with embodiments of this disclosure. In the method 1300, the MPE manager 750 uses the radar detection data 730 (e.g., from current and past radar detection results) to estimate an upper bound RFE for the future time period 960 that is tighter than the worst case exposure. The method 1300 is performed by the MPE manager 750 shown in FIGS. 7 and 8. The method 1300 starts at the current time 940. To avoid duplicative descriptions, the method 1300 includes blocks 1010 and 1050 from FIG. 10. The method 1300 additionally includes blocks 1310, 1320, 1330, and 1340, as described below. The embodiment of the method 1300 shown in FIG. 13 is for illustration only, and other embodiments could be used without departing from the scope of this disclosure.

After the RFE estimator 810 estimates the previous RFE 1060 (illustrated as $RFE_{up}(T_{sofar})$) at block 1010, the method 1300 proceeds to block 1310.

At block 1310, the MPE manager 750 determines whether operational RFE has been reached, and this disclosure provides two embodiments for making this determination. In one embodiment, the previous RFE 1060 ($RFE_{up}(T_{sofar})$) is compared with the operational RFE ($RFE_{ope}$), as shown in FIG. 13. In response to determining $RFE_{up}(T_{sofar}) \geq RFE_{ope}$, which means that the previous RFE 1060 is not less than the operational RFE, the MPE manager 750 determines that the operational RFE has been reached, and the method 1300 proceeds to block 1320. Alternatively, in response to determining $RFE_{up}(T_{sofar}) < RFE_{ope}$, which means that the previous RFE 1060 of the current averaging window 910 is less than the operational RFE limit, the MPE manager 750 determines that communication transmission is allowed, and the method 1300 proceeds to block 1330. In the other embodiment, to ensure a minimum TX power budget, and to reduce the possibility of a transmission interruption, the MPE manager 750 determines whether the condition $RFE_{up}(T_{sofar}) < RFE_{ope} - \Delta$ is satisfied, where $\Delta > 0$.

At block 1320, it has been determined that the human target's accumulative RFE reached $RFE_{ope}$, which is an RF limit corresponding to the current averaging window 910. A, block 1320, in response to this determination, the MPE manager 750 determines that the RFE budget is zero, and therefore, transmission cannot be allowed (i.e., transmission interruption occurs). For example, no transmission can occur until the current averaging window 910 ends. The TX power budget 1360 ($P_{budget}$) is set to zero (0) on the linear scale or set to negative infinity ($-\infty$) on the dB scale. Note that with appropriate radar TX configuration and a proper design choice of $RFE_{ope}$, even in this case that the operational RFE has been reached, the radar 710 may still operate without causing overexposure beyond the MPE limit. The $RFE_{ope}$ is less than the MPE limit.

At block 1330, based on the radar detection data 730, the second RFE predictor 830 predicts the future RFE 1380 as an upper-bound RFE for the future time period 960 (illustrated as $RFE_{pred}(T_{pred}, P_{ref})$). Particularly, the second RFE predictor 830 estimates the future RFE 1280 based on now, which denotes a lower bound estimate of the target's distance from the radar, as shown in Equation 19. The reason for using this $r_{low}$ instead of the raw estimate f of the target distance (i.e., in the current radar sensing result 770) output from the radar 710 is to avoid underestimating the RF exposure in order to satisfy Objective 1. If location of the human target is truly closer to the electronic device 200 than the radar's 710 raw estimated target distance R (770), then MPE's 750 RFE estimates (e.g., previous RFE 1060 and future RFE 1380) would be less than the true exposure, which is an error referred to as underestimation of the RFE. To ensure that the radar's 710 estimated target distance R remains less than the actual distance from the radar to the target, the second RFE predictor 830 uses $r_{low}$ to avoid underestimating the RF exposure. Blocks 1332 and 1334 provide two methods of determining (e.g., bounding) $r_{low}$, described further below. How to bound this now could depend on the design choice of the radar's 710 detection algorithm, such as whether the radar 710 uses a coarse estimate based on radar range resolution or uses a super-resolution option.

$$RFE_{pred}(T_{pred}, P_{ref}) = RFE_{up}(T_{pred}, P_{ref}, r_{low}) \quad (19)$$

In general, humans move frequently. For example, simply taking a breath of air causes a tiny movement of person's body part. As another example, a person sitting on a couch could reach out a hand to grab an electronic device 200 that is resting on a table. As another example, a person who is not nearby could walk toward the table where the electronic device 200 is resting in order to grab the electronic device. During a short time period, from the time 920 that radar 710 outputs the current radar sensing result 770 to the time that the communication module 720 outputs transmits RF energy, a human body part might move from a first location (i.e., corresponding to a target distance $\hat{r}$ measured at the time 920) to a second location (i.e., corresponding to the time of the transmission) that is apart from the first location by a distance $\Delta r$. This distance $\Delta r$ is greater than zero ($\Delta r > 0$) and may correspond to the tiny movement described above. This distance $\Delta r$ can be a constant offset value associated with compensation for an error of overestimation of the target range. At block 1332, the MPE manager 750 determines the lower bound estimate of the target's distance from the radar (illustrated as now) based on a constant offset value (illustrated as $\Delta r$), as shown in Equation 20.

$$r_{low} = \hat{r} - \Delta r \quad (20)$$

At block 1334, the MPE manager 750 determines now based on a speed of the target and a target distance $\hat{r}$ measured at the current time (940 and 920c of FIG. 9) included in the radar detection data 730. In certain embodiments, the speed of the target $v_{target}$ is measured by the radar 710 during the previous time period ($T_{pred}$), such as a maximum speed $v_{max}$ of the target obtained from the radar detection data 730. In other embodiments, the speed of the target $v_{target}$ is a reference speed $v_{ref}$ representing a maximum speed at which a human (e.g., an average human) is capable of moving, which could be obtained via an experimental evaluation. The MPE manager 750 determines now using Equation 21.

$$r_{low} = \max(\hat{r} - v_{max} T_{pred}, 0) \quad (21)$$

Particularly at block 1334, the lower bound estimate of the target's distance ($r_{low}$) predicts a closest location of the target for the future time period 960. That is, from the current time 940 to the end point 914 of the future time period 960, a human body part might move from a first location (i.e., at raw target distance f from the radar 710) to the closest-location (i.e., a predicted location, at a distance now from the radar 710) that is closer to the radar 710 than the first location by a distance $v_{max} T_{pred}$ (similar to $\Delta r$). If the closest-location is not on the surface of the device ($\hat{r}_{low} > v_{max} T_{pred}$ meaning $r_{low} > 0$), then worst-case exposure ($RFE_{sur}$) can be avoided, and the second RFE predictor 830 can predict a future RFE 1380 that is less than the worst-case exposure (i.e., $RFE_{up}(T_{pred}, P_{ref}) \leq RFE_{sur}(T_{pred}, P_{ref})$).

At block 1340, after future RFE 1380 has been computed, the TX power budget calculator 850 determines the TX power budget 1360 (illustrated as $P_{budget}$) using Equation 22, where $T_{wind}$ denotes the time duration of the averaging window. The first term in the min operator $$RFE_{ope} \frac{T_{pred}}{T_{wind}}$$

is the RFE when the exposure is spread out uniformly within the averaging window. If the closest-location case target range $r_{low}$ is maintained as a lower bound of the range, then the exposure per one $T_{pred}$ (i.e., future time period 960) cannot exceed $$RFE_{ope} \frac{T_{pred}}{T_{wind}},$$

and the overall exposure for one averaging window would be lower than or equal to $RFE_{ope}$.

$$P_{budget} = P_{ref} + 10\log_{10} \frac{\min\left(RFE_{ope}\frac{T_{pred}}{T_{wind}}, RFE_{ope} - RFE_{up}(T_{sofar})\right)}{RFE_{up}(T_{pred}, P_{ref}, r_{low})} \quad (22)$$

However, in practical situations, the prediction can be wrong in some instances, and thus the transmission could be interrupted in those cases. By setting a conservative estimate for $r_{low}$, the MPE manager 750 can reduce such occurrences, and in effect reducing the likelihood of a violation of Objective 2. However, a conservative $r_{low}$, causes a conservative $P_{budget}$ BY setting a conservative estimate for $r_{low}$, the MPE manager 750 determines to forgo (tradeoff) some potential for allowing higher TX power. Therefore, determining the $r_{low}$ includes seeking a good balance or tradeoff between allowing high TX power budget while avoiding transmission interruption as much as possible.

Figure 14:
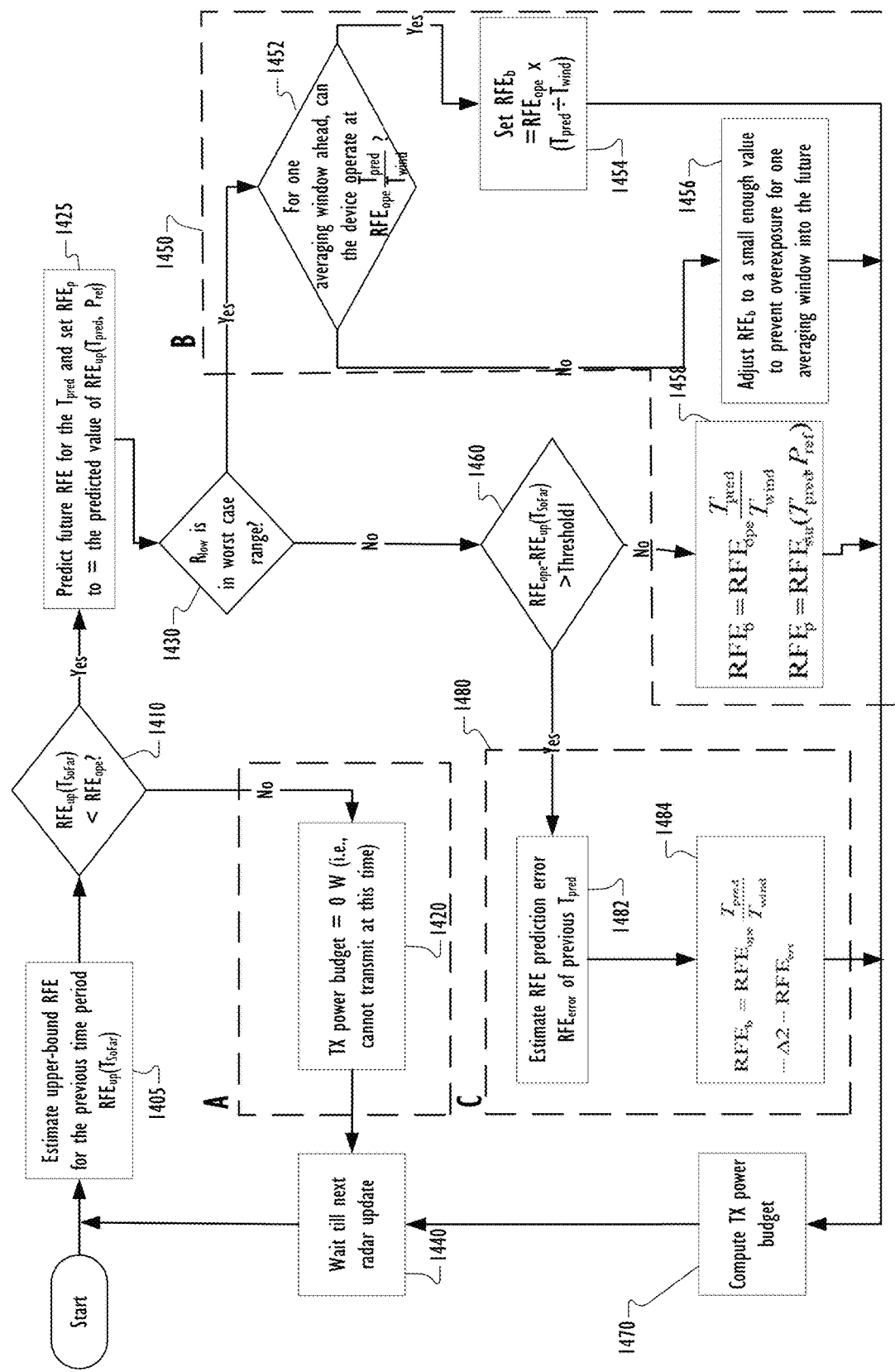
FIG. 14 illustrates a hybrid method for managing RFE and computing a TX power budget based on a determination whether to utilize or disregard radar detection data that corresponds to the previous time period in accordance with an embodiment of this disclosure.

FIG. 14 illustrates a hybrid method 1400 for managing RFE and computing a TX power budget based on a determination whether to utilize or disregard radar detection data that corresponds to the previous time period in accordance with an embodiment of this disclosure. The embodiment of the method 1400 shown in FIG. 14 is for illustration only, and other embodiments could be used without departing from the scope of this disclosure. The method 1400 could be performed by a processor 240 of the electronic device 200 executing the MPE manager 750 of FIGS. 7 and 8. For ease of explanation, the method 1400 is described as being performed by the MPE manager 750 and its components of FIG. 8.

The method 1400 introduces additional conditions to improve the likelihood of satisfying both Objective 1 and Objective 2 and introduces additional mechanisms to ensure smooth operation. According to method 1400, when the previous RFE 860 is close to the RFE limit, MPE manager 750 follows "Solution 1" by assuming the worst case exposure for the future time period 960 and makes a conservative choice for the TX power budget. When the previous RFE 860 is not close to the RFE limit, the MPE manager 750 follows "Solution 2" that uses recent radar detection data 730 to predict the RF exposure for a certain duration into the future. This method 1400 enables a tighter estimate of the RF exposure (allowing an increased risk for error but managing the risk because the previous RF exposure 860 is low compared to the RFE limit) and can allow a more aggressive choice of the TX power budget.

The description of FIG. 14 will include both a simplified version and a detailed version of the method 1400. The detailed version of the method 1400 includes all of the blocks of the simplified version, and additional blocks such as block 1405. The simplified version of the method 1400 includes blocks 1410, 1420, 1430, 1450, 1460, 1470, and 1480. In the simplified version of the method 1400, the RFE predictor 815 predicts an upper bound RFE for the future time period by selecting to use the first RFE predictor 820 or the second RFE predictor 830, depending on the situation. When it is determined that the situation risk for violating the MPE limit is high, the first RFE predictor 820 is selected as a more conservative algorithm that predicts the future RFE 881 by assuming a worst-case exposure condition. The risk for violating the MPE limit is high under two conditions: (1) when the radar sensing result 770 indicates that the target is under the worst-case exposure condition (determined at block 1430); or (2) when the target is not under the worst-case exposure condition, but the RFE budget is too small (determined at block 1460). For these situations, it is more prudent to be conservative in estimating the future RFE, and to avoid underestimation of the RFE. When it is determined that the situation risk for violating the MPE limit is low, then the second RFE predictor 830 is selected as a more aggressive approach for predicting the second future RFE 882. The risk for violating the MPE limit is not high under one condition: the target is not in the worst-case exposure situation, and the RFE budget is large enough (e.g., larger than some threshold).

The detailed version of the method 1400 will now be described. At the start of the method 1400, the RFE limit ($RFE_{lim}$) and the averaging window ($T_{wind}$) that corresponds to the RFE limit has been preset. The RFE limit can be set as the MPE limit or as the operational RFE.

At block 1405, the RFE estimator 810 estimates the previous RFE 860 that accumulated onto a target during the previous time period 950. The procedure performed at block 1405 can be the same or similar to the procedure performed at block 1010 of FIGS. 10, 11, and 13. The estimated previous RFE 860, which is an upper bound RFE (illustrated as $RFE_{up}(T_{SoFar})$) is then used at block 1410.

At block 1410, the MPE manager 750 determines whether the previous RFE 860 has reached the RFE limit, to ensure the human target has not been overexposed relative to the desired exposure limit. The procedure performed at block 1410 can be the same or similar to the procedure performed at block 1310 of FIG. 13. In response to a determination that the previous RFE 860 has reached the RFE limit (i.e., $RFE_{up}(T_{SoFar}) < RFE_{ope}$ is false), the method proceeds to block 1420. In response to a determination that the RFE limit has not yet been reached (i.e., $RFE_{up}(T_{SoFar}) < RFE_{ope}$ is true), the method 1400 proceeds to blocks 1425 and 1430.

At block 1420, the MPE manager 750 skips the current transmission, then the method 1400 proceeds to block 1440. More particularly, it is determined that the RFE budget is zero, and transmission interruption occurs until the current averaging window 910 ends. The procedure at block 1420 can be the same or similar to the procedure performed at block 1320 of FIG. 13. At block 1440 (which is similar to block 1050 of FIGS. 10, 11, and 13), the MPE manager 750 waits till the next radar update, then the method 1400 restarts.

At block 1425, the RFE predictor 815 predicts the future RFE 880, which is an upper bound RFE corresponding to the future time period 960 (illustrated as $RFE_{up}(T_{pred}, P_{ref})$). The procedure at block 1425 can be the same or similar to the procedure performed at block 1330 of FIG. 13. Further at block 1425, this predicted value of the future RFE 880 is set to $RFE_p$, then the method 1400 proceeds to block 1430. According to the method 1400, $RFE_b$ and $RFE_p$ denote the RFE budget and the predicted RFE for the future time period, respectively. Compared to the fixed values of $RFE_{budget}$ and $RFE_{prediction}$ in methods 1100 and 1300 of FIGS. 11 and 13, the method 1400 provides $RFE_b$ and $RFE_p$ that are adaptive based on the situation.

At block 1430, the MPE manager 750 determines whether the target is "deemed" in a worst-case exposure condition within the averaging window $T_{wind}$, which is a condition in which the estimated/predicted closest-location of the target (i.e., at a distance $r_{low}$ from the radar 710) is less than a threshold close-proximity distance to a surface of the electronic device (e.g., <5 cm). In response to a determination that the target is in the worst-case exposure condition, the method proceeds to block 1450, particularly to block 1452. In response to a determination that the target is not in the worst-case exposure condition (i.e., $r_{low}$< Threshold$_{close\text{-}proximity}$ is false), the method 1400 proceeds to block 1460.

In a very conservative a design choice, the threshold close-proximity distance can be set such that if the target is detected within the field of view 510 of the radar, then the target is in a worst-case exposure condition. In a more practical embodiment, the threshold close-proximity distance can be set at a nominal value Within block 1450, the MPE manager 750 follows "Solution 1" associated with the first RFE predictor 820 and the corresponding first algorithm that assumes the worst-case exposure for the future time period 960 and selects a conservative TX power budget ($P_{budget}$). Block 1450 includes blocks 1452, 1454, 1456, and 1458, which are described further below. The method proceeds from block 1450 to block 1470.

At block 1452, the MPE manager 750 determines if it is possible to operate at RFE$_b$ for at least one averaging window into the future without causing over exposure (assuming the situation continues to be in the worst-case exposure condition), wherein RFE$_b$ is determined according to Equation 23. If this choice to define RFE$_b$ by Equation 23 is a supportable choice, then the method proceeds to block 1454 to implement this choice. However, if this choice of RFE$_b$ could cause over exposure for one averaging window into the future (assuming it continues to be in the worst case exposure situation), then the method proceeds to block 1456.

At block 1454, the MPE manager sets RFE$_b$ as defined by Equation 23, then the TX power budget is determined (at block 1470).

$$RFE_b = RFE_{ope}\frac{T_{pred}}{T_{wind}} \quad (23)$$

At block 1456, the choice of RFE$_b$ is adjusted to a small enough value to avoid overexposure relative to the desired RFE limit, for one averaging window into the future. This disclosure provides different ways to accomplish this adjustment. One example is to first find the most recent radar update duration $T_i$, where the RFE estimate was higher than $$RFE_{ope}\frac{T_{pred}}{T_{wind}}.$$

Then, RFE$_b$ is determined according to Equation 24, where N is the number of radar detection updates within $T_{sofar}$, and it is assumed that $T_n$ are in the order of time, where $T_N$ is the radar update duration of the current time, and $T_1$ is the radar update duration corresponding to the starting point of the current averaging window.

$$RFE_b = \frac{RFE_{ope} - \sum_{n=i}^{N} RFE_{up}(T_n)}{i+1} \quad (24)$$

At block 1458, the MPE manager 750 opts to operate at the worst-case assumption a bit longer to accumulate more margin in the RFE, by using uniform distribution similar to block 1452. Here, RFE$_b$ determined based on Equation 25, and RFE$_p$ is determined according to Equation 26.

$$RFE_b = RFE_{ope}\frac{T_{pred}}{T_{wind}} \quad (25)$$

$$RFE_p = RFE_{sur}(T_{pred}, P_{ref}) \quad (26)$$

At block 1460, the MPE manager 750 determines whether the future RFE satisfies a risk condition, particularly by determining whether the RFE budget is greater than a Thresholds. Particularly, the MPE manager 750 computes an RFE margin, which is the previous RFE 860 subtracted from the operational RFE, and then determines whether the RFE margin is greater than the Thresholds. In response to a determination that the RFE budget is greater than a Thresholds (i.e., RFE$_{ope}$−RFE$_{up}$(T$_{SoFar}$)>Threshold$_1$ is true), the MPE manager 750 determines that future RFE satisfies the risk condition based on the RFE budget being within a second margin of the RFE limit, and the method proceeds to block 1480. In response to a determination that the RFE budget is not greater than the Thresholds (i.e., RFE$_{ope}$−RFE$_{up}$(T$_{SoFar}$)>Threshold$_1$ is false), the MPE manager 750 determines that future RFE does not satisfy the risk condition based on the RFE budget being within a first margin of the MPE limit, the method 1400 proceeds to block 1450, particularly to block 1458.

Threshold$_1$ is selected to ensure there is no communication interruption (e.g., transmission interruption) due to exposure exceeding the desired limit (i.e., to satisfy Objective 2). This is achieved by setting Threshold1 large enough such that no matter the error in the prediction of the target location in the future time period, the predicted future RFE (determined at block 1425) would not saturate the desired exposure limit. An example choice of Threshold1 to accomplish this is to set it to the difference (in dB) between the RFE of the worst-case exposure to the RFE of the best-case exposure (e.g., when target is far enough that a TX power is not restricted by RFE considerations). This choice could depend on various factors, including but not limited to the communication beam patterns, the radar field-of-view, and the duration of the $T_{pred}$ (e.g., future time period 960). Note that the 'Yes' branch of the block 1460 is more aggressive in the calculation of the TX power budget, as it uses the predicted future RFE based on the radar detection result.

At block 1470, the TX power budget is determined by the TX power budget calculator 850, and the method proceeds to block 1440.

$$P_{budget} = P_{ref} + 10\log_{10}\frac{RFE_b}{RFE_p} \quad (27)$$

Within block 1480, the MPE manager 750 follows "Solution 2" associated with the second RFE predictor 830 and the corresponding second algorithm that predicts the future RFE 880 based on recent radar detection data 730. Block 1480 includes blocks 1482 and 1484, which are described further below. The method proceeds from block 1480 to block 1470.

At block 1482, the MPE manager 750 estimates the error (RFE$_{error}$) in the RFE prediction of the previous $T_{pred}$. The estimating of the error is possible at this time because the historical radar sensing results for the previous prediction period (i.e., previous $T_{pred}$) is obtained from the radar detection data 730. This estimated $RFE_{error}$ is then used in block 1484 to adjust $RFE_b$.

At block 1484, the $RFE_b$ is adjusted to be more accurate based on the latest sensing result 770. Particularly, the $RFE_b$ is adjusted based on the estimated $RFE_{error}$ and a parameter Δ2, as shown in Equation 28. The parameter Δ2 is used to avoid oscillation between the two branches (YES/NO) of the decision block 1460. The parameter Δ2 could be set to be equal or larger than Threshold1 (of block 1460) to avoid oscillating between these two branches of the decision block 1460.

$$RFE_b = RFE_{ope}\frac{T_{pred}}{T_{wind}} - \Delta 2 - RFE_{error} \quad (28)$$

Although FIG. 14 illustrates an example method 1400, various changes may be made to FIG. 14. For example, while shown as a series of steps, various steps in FIG. 14 could overlap, occur in parallel, occur in a different order, or occur any number of times.

Figure 15:
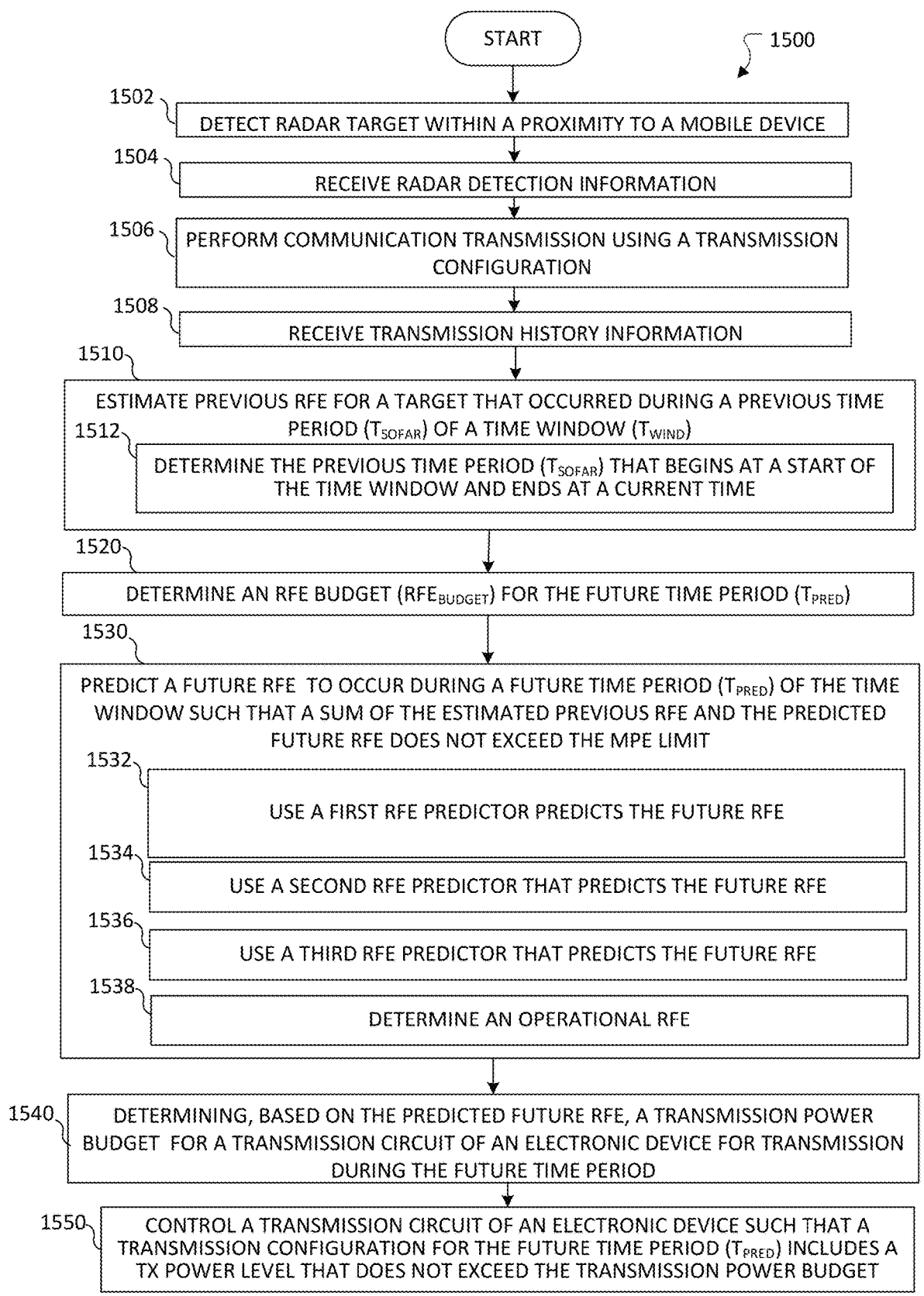
FIG. 15 illustrates a method determining transmit power budget for managing RF exposure of mobile devices using radar sensing in accordance with an embodiment of this disclosure.

FIG. 15 illustrates a method 1500 for determining transmit power budget for managing RF exposure of mobile devices using radar sensing in accordance with an embodiment of this disclosure. The embodiment of the method 1500 shown in FIG. 15 is for illustration only, and other embodiments could be used without departing from the scope of this disclosure. The method 1500 is implemented by an electronic device 200. More particularly, the method 1500 could be performed by a processor 240 of the electronic device 200 executing the applications 262 associated with the MPE manager 750. For ease of explanation, the method 1500 is described as being performed by the processor 240.

At the start of the method 1500, the MPE limit that corresponds to a time window is identified, which may be predetermined values. In block 1502, the processor 240 detects radar target within a proximity to the electronic device 200.

At block 1504, the processor 240 receives radar detection information including a distance to a target. The radar detection information includes current and historical radar sensing results. A radar sensing result 770 includes a measured distance to the target, and a speed of the target. The speed of the target can be a reference value, such as a maximum speed of a human. The speed of the target can be a measured value, such as a target's maximum speed ($v_{max}$) detected by the radar during the current averaging window 910.

At block 1506, the processor 240 transmits RF energy, for example, performing communication transmission using an adopted transmission configuration.

At block 1508, the processor 240 receives historical transmission data 740 including a transmit (TX) power level for the transmission of RF energy, for example, a TX power for the communication transmission.

At block 1510, the processor 240 estimates a previous RFE for a target that occurred during a previous time period ($T_{sofar}$) of a time window ($T_{wind}$), based on current and historical radar detection data 730 and transmission data 740. Determined at block 1512, the previous time period ($T_{sofar}$) begins at a start point 912 of the time window and ends at a current time 940.

Blocks 1520 and 1530, the processor 240 predicts a future RFE 880 on the target to occur during a future time period 960 of the averaging window 910, based on an RFE budget ($RFE_{budget}$) 870 determined for the future time period 960. Block 1520 can be a subprocess within block 1530 in certain embodiments, wherein the procedure of predicting the future RFE 880 includes the procedure of determining the RFE budget 870.

As shown at block 1520, the processor 240 determines the $RFE_{budget}$ 870.

As shown at block 1530, the processor 240 predicts a future RFE 880 on the target to occur during a future time period 960 of the averaging window 910 such that a sum of the estimated previous RFE 860 and the predicted future RFE 880 does not exceed the RFE limit for the averaging window 910.

At block 1532, the processor 240 (using a first RFE predictor 820 of FIGS. 8 and 11) predicts the future RFE 881, 1180 using (i) a surface RFE value for an assumption that a surface of the electronic device will be in physical contact with the target for a duration of the future time period and (ii) a reference transmit power density.

At block 1534, the processor 240 (using a second RFE predictor 830 of FIGS. 8 and 13) predicts the future RFE 880 based on the predicted change of distance to the target. Particularly, the processor 240 predicts a change of distance (e.g., change to now) to the target to occur during the future time period 960 based on a speed of the target and at least one measured distance to the target from the radar detection data 730.

At block 1536, the processor 240 (using a third RFE predictor 840 of FIGS. 8 and 14) predicts the future RFE 880 based on a determination result of whether an RFE budget satisfies a risk condition relative to the MPE limit. The RFE budget represents a margin between the MPE limit and the previous RFE. In response to a determination that the RFE budget does not satisfy the risk condition, the future RFE is predicted (similar to block 1532) using (i) a surface RFE value for an assumption that a surface of the electronic device will be in physical contact with the target for a duration of the future time period and (ii) a reference transmit power density. In response to a determination that the RFE budget satisfies the risk condition, the processor 240 predicts (similar to block 1534) the future RFE based on a predicted change of distance to the target. The risk condition is satisfied when $RFE_{ope}-RFE_{up}(T_{sofar})$>Threshold1 is TRUE. Determining whether the RFE budget satisfies a risk condition includes determining that RFE budget does not satisfy the risk condition based on the RFE budget being within a first margin (e.g., $RFE_{ope}-RFE_{up}(T_{sofar})$>Threshold1 is FALSE) of the MPE limit; and determining that the future RFE satisfies the risk condition based on the RFE budget being within a second margin (e.g., $RFE_{ope}-RFE_{up}(T_{sofar})$>Threshold1 is TRUE) of the MPE limit At block 1538, the processor 240 determines an operational RFE that is less than the MPE limit and predicts the future RFE such that a sum of the estimated previous RFE and the predicted future RFE does not exceed the operational RFE. Practically, the operational RFE replaces the MPE limit as the amount that will not be exceeded at all times.

In block 1540, based on the predicted future RFE 880, the processor 240 determines a TX power budget 760 ($P_{budget}$) for a transmission circuit (e.g., transceivers 210 of FIG. 2) of an electronic device 200 for transmission (of RF energy) during the future time period 960. For example, the transmission power budget can be determined based on a reduction by an offset value associated with compensation for an overestimation error associated with at least one measured distance to the target from the radar detection information In block 1550, the processor 240 controls the transceiver(s) 210 of the electronic device 200 such that a transmission configuration 780 for the future time period 960 includes a TX power that does not exceed the TX power budget 760.

Although FIG. 15 illustrates an example method 1500, various changes may be made to FIG. 15. For example, while shown as a series of steps, various steps in FIG. 15 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for managing a maximum permissible exposure (MPE) limit that corresponds to a time window, the method comprising:
   estimating, based on radar detection information and transmission history information, a previous radio frequency exposure (RFE) for a target that occurred during a previous time period of the time window;
   predicting a future RFE on the target to occur during a future time period of the time window such that a sum of the estimated previous RFE and the predicted future RFE does not exceed the MPE limit for the time window; and
   determining, based on the predicted future RFE, a transmission power budget for a transceiver of an electronic device for transmission during the future time period.

2. The method of claim 1, wherein predicting the future RFE further comprises predicting the future RFE using (i) a surface RFE value for an assumption that a surface of the electronic device will be in physical contact with the target for a duration of the future time period and (ii) a reference transmit power density.

3. The method of claim 1, further comprising:
   predicting a change of distance to the target to occur during the future time period based on a speed of the target and at least one measured distance to the target from the radar detection information,
   wherein predicting the future RFE further comprises predicting the future RFE based on the predicted change of distance to the target.

4. The method of claim 1, further comprising:
   determining whether an RFE budget for the future time period satisfies a risk condition relative to the MPE limit, wherein the RFE budget represents a margin between the MPE limit and the previous RFE;
   in response to a determination that the RFE budget does not satisfy the risk condition, predicting the future RFE using (i) a surface RFE value for an assumption that a surface of the electronic device will be in physical contact with the target for a duration of the future time period and (ii) a reference transmit power density; and
   in response to a determination that the RFE budget satisfies the risk condition, predicting a change of distance to the target to occur during the future time period based on at least one measured distance to the target from the radar detection information, wherein predicting the future RFE further comprises predicting the future RFE based on the predicted change of distance to the target.

5. The method of claim 4, wherein determining whether the RFE budget satisfies a risk condition comprises:
   determining that RFE budget does not satisfy the risk condition based on the RFE budget being within a first margin of the MPE limit; and
   determining that the RFE budget satisfies the risk condition based on the RFE budget being within a second margin of the MPE limit.

6. The method of claim 1, wherein determining the transmission power budget further comprises determining the transmission power budget based on a reduction by an offset value associated with compensation for an overestimation error associated with at least one measured distance to the target from the radar detection information.

7. The method of claim 1, further comprising:
   determining an operational RFE that is less than the MPE limit,
   wherein predicting the future RFE comprises predicting the future RFE such that a sum of the estimated previous RFE and the predicted future RFE does not exceed the operational RFE.

8. An electronic device comprising:
   a transceiver; and
   a processor operatively connected to the transceiver, the processor configured to:
   identify a maximum permissible exposure (MPE) limit that corresponds to a time window;
   estimate, based on radar detection information and transmission history information, a previous radio frequency exposure (RFE) for a target that occurred during a previous time period of the time window;
   predict a future RFE on the target to occur during a future time period of the time window such that a sum of the estimated previous RFE and the predicted future RFE does not exceed the MPE limit for the time window; and
   determine, based on the predicted future RFE, a transmission power budget for the transceiver of an electronic device for transmission during the future time period.

9. The electronic device of claim 8, wherein to predict the future RFE, the processor is further configured to predict the future RFE using (i) a surface RFE value for an assumption that a surface of the electronic device will be in physical contact with the target for a duration of the future time period and (ii) a reference transmit power density.

10. The electronic device of claim 8, wherein the processor is further configured to:
   predict a change of distance to the target to occur during the future time period based on a speed of the target and at least one measured distance to the target from the radar detection information,
   wherein to predict the future RFE, the processor is further configured to predict the future RFE based on the predicted change of distance to the target.

11. The electronic device of claim 8, wherein the processor is further configured to:
   determine whether an RFE budget for the future time period satisfies a risk condition relative to the MPE limit, wherein the RFE budget represents a margin between the MPE limit and the previous RFE;
   in response to a determination that the RFE budget does not satisfy the risk condition, predict the future RFE using (i) a surface RFE value for an assumption that a surface of the electronic device will be in physical contact with the target for a duration of the future time period and (ii) a reference transmit power density; and
   in response to a determination that the RFE budget satisfies the risk condition, predict a change of distance to the target to occur during the future time period based on at least one measured distance to the target from the radar detection information,
   wherein to predict the future RFE, the processor is further configured to predict the future RFE based on the predicted change of distance to the target.

12. The electronic device of claim 11, wherein to determine whether the RFE budget satisfies a risk condition, the processor is further configured to:
   determine that RFE budget does not satisfy the risk condition based on the RFE budget being within a first margin of the MPE limit; and
   determine that the RFE budget satisfies the risk condition based on the RFE budget being within a second margin of the MPE limit.

13. The electronic device of claim 8, wherein to determine the transmission power budget, the processor is further configured to determine the transmission power budget based on a reduction by an offset value associated with compensation for an overestimation error associated with at least one measured distance to the target from the radar detection information.

14. The electronic device of claim 8, wherein:
   the processor is further configured to determine an operational RFE that is less than the MPE limit, and
   to predict the future RFE, the processor is further configured to predict the future RFE such that a sum of the estimated previous RFE and the predicted future RFE does not exceed the operational RFE.

15. A non-transitory computer readable medium embodying a computer program, the computer program comprising program code that when executed causes a processor to:
   identify a maximum permissible exposure (MPE) limit that corresponds to a time window;
   estimate, based on radar detection information and transmission history information, a previous radio frequency exposure (RFE) for a target that occurred during a previous time period of the time window;
   predict a future RFE on the target to occur during a future time period of the time window such that a sum of the estimated previous RFE and the predicted future RFE does not exceed the MPE limit for the time window; and
   determine, based on the predicted future RFE, a transmission power budget for a transceiver of an electronic device for transmission during the future time period.

16. The non-transitory computer readable medium of claim 15, wherein the program code that when executed causes the processor to predict the future RFE further comprise program code that when executed causes the processor to predict the future RFE using (i) a surface RFE value for an assumption that a surface of the electronic device will be in physical contact with the target for a duration of the future time period and (ii) a reference transmit power density.

17. The non-transitory computer readable medium of claim 15, further comprising program code that when executed causes the processor to:
   predict a change of distance to the target to occur during the future time period based on a speed of the target and at least one measured distance to the target from the radar detection information,
   wherein to predict the future RFE, the program code causes the processor to predict the future RFE based on the predicted change of distance to the target.

18. The non-transitory computer readable medium of claim 15, further comprising program code that when executed causes the processor to:
   determine whether an RFE budget for the future time period satisfies a risk condition relative to the MPE limit, wherein the RFE budget represents a margin between the MPE limit and the previous RFE;
   in response to a determination that the RFE budget does not satisfy the risk condition, predict the future RFE using (i) a surface RFE value for an assumption that a surface of the electronic device will be in physical contact with the target for a duration of the future time period and (ii) a reference transmit power density; and
   in response to a determination that the RFE budget satisfies the risk condition, predict a change of distance to the target to occur during the future time period based on at least one measured distance to the target from the radar detection information,
   wherein to predict the future RFE, the program code causes the processor to predict the future RFE based on the predicted change of distance to the target.

19. The non-transitory computer readable medium of claim 18, wherein the program code that when executed causes the processor to determine whether the RFE budget satisfies a risk condition further comprise program code that when executed causes the processor to:
   determine that RFE budget does not satisfy the risk condition based on the RFE budget being within a first margin of the MPE limit; and
   determine that the RFE budget satisfies the risk condition based on the RFE budget being within a second margin of the MPE limit.

20. The non-transitory computer readable medium of claim 15, further comprising program code that when executed causes the processor to:
   determine an operational RFE that is less than the MPE limit, wherein to predict the future RFE, the processor is further configured to predict the future RFE such that a sum of the estimated previous RFE and the predicted future RFE does not exceed the operational RFE.

* * * * *